US012737260B2

(12) United States Patent
Bhargava M.R. et al.

(10) Patent No.: US 12,737,260 B2
(45) **Date of Patent: *Sep. 15, 2026**

(54) VOLUME GROUP RESTORE FROM REMOTE OBJECT STORE

(71) Applicant: NetApp, Inc., San Jose, CA (US)

(72) Inventors: Rakesh Bhargava M.R., Bengaluru (IN); Murali Subramanian, Bangalore (IN); Tijin George, Sunnyvale, CA (US); Ching-Yuk Paul Ngan, Redwood City, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/030,358

(22) Filed: Jan. 17, 2025

(65) Prior Publication Data

US 2025/0165349 A1 May 22, 2025

Related U.S. Application Data

(62) Division of application No. 17/730,899, filed on Apr. 27, 2022, now Pat. No. 12,229,010.

(51) Int. Cl.
*G06F 11/10* (2006.01)
*G06F 11/1446* (2026.01)

(52) U.S. Cl.
CPC ...... *G06F 11/1448* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 10,409,692 B1 | 9/2019 | Brenner et al. | |
| 10,852,976 B2 | 12/2020 | George et al. | |
| 11,016,943 B2 | 5/2021 | George et al. | |
| 11,144,498 B2 | 10/2021 | George et al. | |
| 11,188,500 B2 | 11/2021 | Kushwah et al. | |
| 11,907,116 B2 | 2/2024 | Bhargava M. R. et al. | |
| 12,229,010 B2 | 2/2025 | Bhargava M. R. et al. | |
| 2013/0262800 A1 | 10/2013 | Goodman et al. | |
| 2015/0278034 A1* | 10/2015 | Barnes | G06F 11/1004 714/15 |

(Continued)

OTHER PUBLICATIONS

Co-pending U.S. Appl. No. 17/730,938, inventors Rakesh; Bhargava M.R. et al., filed Apr. 27, 2022.

(Continued)

*Primary Examiner* — Belix M Ortiz Ditren
(74) *Attorney, Agent, or Firm* — Cooper Legal Group, LLC

(57) ABSTRACT

Techniques are provided for volume group backup, volume group restore, and volume group garbage collection for volume groups backed up to an object store. A volume group workflow is implemented to orchestrate individual consistent volume workflows that are separately and individually implemented by nodes hosting constituent volumes of a volume group. The volume group workflow and the individual consistent volume workflows are performed to back up the volume group to the object store, restore a volume group backup from the object store to a restore destination, and/or perform garbage collection on slots of objects storing data unique to a volume group backup to delete.

20 Claims, 19 Drawing Sheets

(56) References Cited

U.S. PATENT DOCUMENTS

| | | | |
|---|---|---|---|
| 2020/0019620 | A1 | 1/2020 | Sarda et al. |
| 2020/0128024 | A1* | 4/2020 | Kuramkote ......... H04L 41/0816 |
| 2020/0285410 | A1* | 9/2020 | George ................. G06F 3/0644 |
| 2020/0285611 | A1 | 9/2020 | George et al. |
| 2020/0285613 | A1 | 9/2020 | George et al. |
| 2020/0285614 | A1 | 9/2020 | George et al. |
| 2021/0406216 | A1 | 12/2021 | Komatsu et al. |
| 2023/0350573 | A1 | 11/2023 | Bhargava M.R. et al. |
| 2023/0350758 | A1 | 11/2023 | Bhargava M.R. et al. |
| 2023/0350801 | A1 | 11/2023 | Bhargava M.R. et al. |

OTHER PUBLICATIONS

Final Office Action mailed Aug. 28, 2023 for U.S. Appl. No. 17/730,643, filed Apr. 27, 2022, 17 pages.
Non-Final Office Action mailed on Jun. 21, 2024 for U.S. Appl. No. 17/730,899, filed Apr. 27, 2022, 10 pages.
Non-Final Office Action mailed on May 3, 2023 for U.S. Appl. No. 17/730,643, filed Apr. 27, 2022, 15 pages.
Notice of Allowance mailed on Oct. 9, 2024 for U.S. Appl. No. 17/730,899, filed Apr. 27, 2022, 08 pages.
Notice of Allowance mailed on Oct. 12, 2023 for U.S. Appl. No. 17/733,078, filed Apr. 29, 2022, 9 pages.

* cited by examiner

700

CLOUD SNAPSHOT CREATE

SDE

POD

PRIMARY STORAGE CONTAINER

CREATE SNAPSHOT-IN-CLOUD

POST

CREATE RELATIONSHIP AND START TRANSFER

SUCCESS

ERROR – RESEND POST

GET

RETURN "CREATING" STATUS

UPDATE CRD WITH ENDPOINT UUID & PROGRESS INFO

RETURN "CREATED" STATUS

UPDATED CRD INDICATING COMPLETED SNAPSHOT

ERROR – RESEND POST

SDE

POD

PRIMARY STORAGE CONTAINER

VOLUME GROUP RESTORE FROM REMOTE OBJECT STORE

RELATED APPLICATION

This application claims priority to and is a divisional of U.S. patent application Ser. No. 17/567,182, filed on Jan. 3, 2022 and titled "SYNCHRONOUS REPLICATION FOR STORAGE AREA NETWORK PROTOCOL STORAGE," which is incorporated herein by reference.

BACKGROUND

The rapid growth of applications and datasets has led to the demand for storage that can scale with the needs of various types of user workloads. In order to provide scalable storage to meet such demands, a volume group can be used to provide flexible and scalable storage. The volume group consist of any number of constituent volumes that can be hosted across any number of nodes of a distributed storage cluster. As storage demands increase or decrease, constituent volumes can be dynamically added to or removed from the volume group in order to scale based upon current demand. The volume group combines local storage file systems of the constituent volumes in the distributed storage cluster to provide a single namespace that seamlessly scales across aggregate resources of the distributed storage cluster (e.g., CPU, storage, memory, etc.) while preserving features and robustness of the local storage file systems.

DETAILED DESCRIPTION

Figure 1:
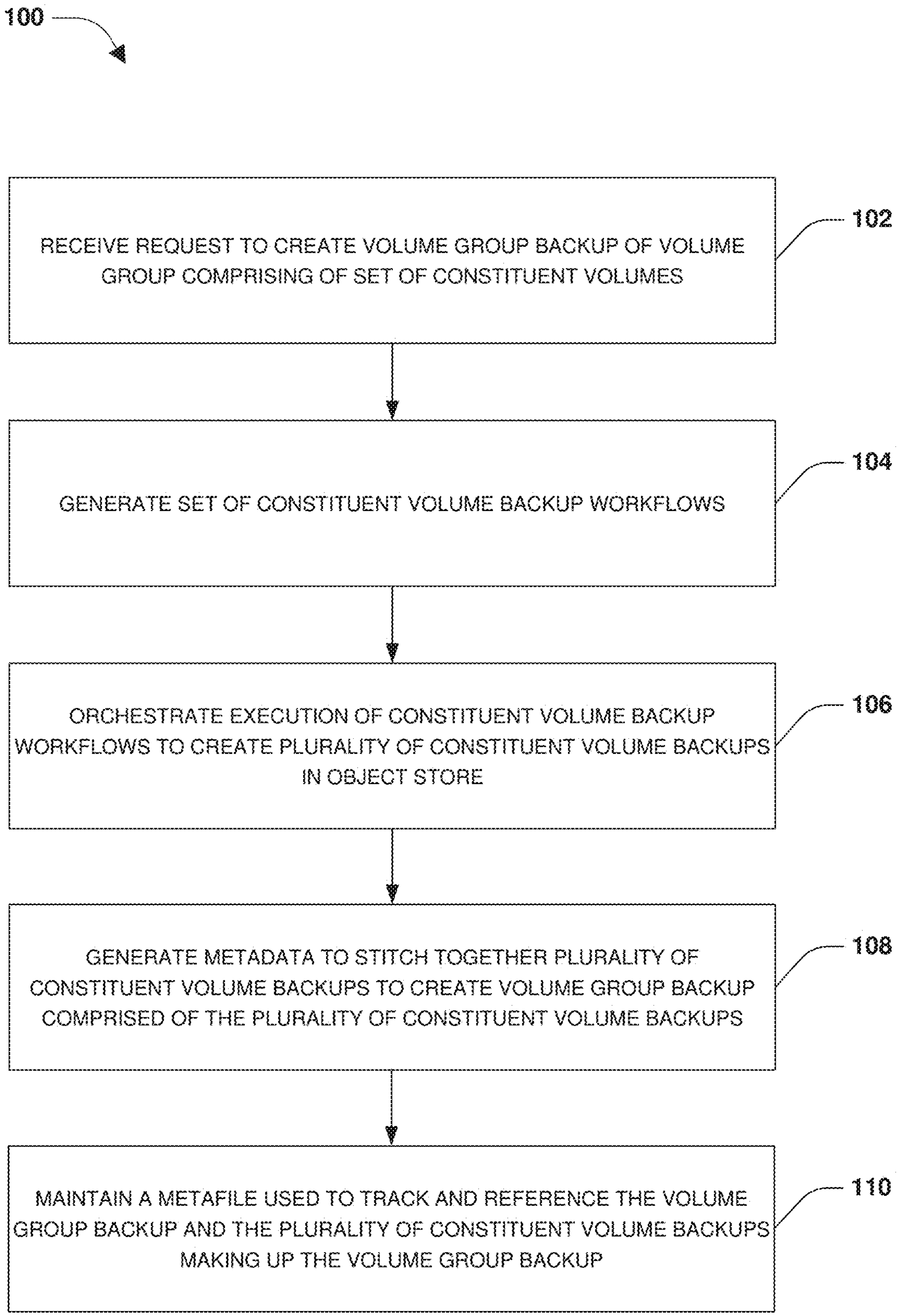
FIG. 1 is a flow chart illustrating an example method for orchestrating a volume group backup in accordance with various embodiments of the present technology.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

As users create and store larger amounts of data and implement resource intensive workloads and services, storage systems must be able to scale out in a flexible manner to accommodate such storage and resource utilization. Traditionally, a storage system may store user data within a volume that can be mounted to by client devices of a user for accessing the volume. When the volume is created, the volume is assigned a particular name, size, and/or other properties. Over time, the volume may become full, and the storage system must provision an additional volume for the user. This is not a flexible or scalable solution, and can be disruptive and time consuming. Accordingly, a volume group may be implemented to provide flexible and scalable storage for the user. The volume group is composed of a plurality of constituent volumes that can be hosted across nodes of a distributed storage cluster. As storage demands increase or decrease, constituent volumes can be dynamically added to or remove from the volume group in order to scale based upon current demand.

To provide storage redundancy, backup/restore functionality, and failure recovery, the storage system may generate snapshots of volumes as volume backups. In some embodiments, each node hosting constituent volumes of the volume group may create constituent volume backups (snapshots) of the constituent volumes hosted by the node. Over time, the amount of storage consumed by the constituent volume backups can be significant. If the constituent volume backups are stored on-prem, such as using local storage of the nodes, then storing the constituent volume backups can become very costly. Accordingly, it would be advantageous to store the constituent volume backups to an object store for low cost long term storage provided by a cloud storage environment hosting the object store. Conventional techniques for storing snapshots to the object store are capable of storing a snapshot of a single volume within the object store, which may be later retrieved to restore that volume. Snapshot data of the snapshot may be stored within slots of objects that are then stored within the object store. Snapshot data of a snapshot may be stored across multiple objects, and an object may comprise snapshot data referenced by multiple snapshots due to the incremental nature of snapshots. The objects may be formatted according to a particular object format. Additional details regarding how snapshots backed up to the object store are represented will be subsequently described in relation to FIGS. 11A and 11B, additional details regarding the object format will be subsequently described in relation to FIG. 11C, and additional details regarding snapshots in the object store will be subsequently described in relation to FIGS. 7-10.

Because snapshot data of snapshots are stored across any number of objects in the object store, and an object may comprise snapshot data referenced by multiple snapshots, creating and storing a backup of a volume group composed of multiple constituent volumes to the object store is not possible with conventional backup techniques. There is no way to back up a volume group to the object store as a volume group backup and later restore the volume group backup. Thus, users cannot utilize conventional backup functionality to take advantage of the low cost and scalable storage of the object store for backing up volume groups.

The techniques disclosed herein provide the capability to back up a volume group to the object store as a volume group backup, restore the volume group backup from the object store, and perform garbage collection when a volume group backup is deleted. This provides users with the ability to take advantage of the lower cost and scalable storage of the object store for storing volume group backups. This is enabled through the use of new metafiles and metadata used to stitch together individual constituent volume backups of consistent volumes of a volume group to create a volume group backup that can be stored in the object store, restored from the object store, and deleted from the object store while implementing garbage collection. Additionally, an orchestrator is provided that implements a volume group workflow to orchestrate and coordinate individual volume level workflows individually implemented by nodes hosting the constituent volumes. The volume group workflow may relate to backing up a volume group, restoring a volume group, and/or implementing garbage collection for a volume group at a group level. An individual volume level workflow may relate to backing up a constituent volume, restoring a constituent volume, and/or implementing garbage collection for a constituent volume at a volume item level. The volume group workflow is used to orchestrate and coordinate individual volume level workflows to ensure that all individual volume level workflows are successfully performed in order to safely and successfully perform a volume group operation, such as in an atomic manner.

Providing the ability to back up a volume group to an object store provides flexible, long term, scalable, and low cost storage for backing up the volume group. The backup is performed using group level and volume item level workflows that are orchestrated in an efficient manner that ensures that the backup is performed in an atomic manner so that the backup operation is not deemed successful unless all constituent volume backups of a volume group backup succeed. New metadata and metafiles are used to stitch together the individual constituent volume backups (constituent volume snapshots) as the volume group backup (a volume group snapshot) that can be restored to any restore target. Storage consumption in the object store is managed in an efficient manner to reduce wasted storage by implementing a garbage collection process that is orchestrated through garbage collection workflows at a group level and volume item level so that backup data that is no longer used can be freed for storing other data. Backup, restore, and garbage collection may be implemented by an orchestrator. In some embodiments, the orchestrator may be hosted on a node, such as a storage system that implements a storage operating system. In some embodiments, the orchestrator may be hosted through one or more serverless threads of a serverless thread environment. In some embodiments, the orchestrator may be hosted within one or more containers of a container orchestration platform, such as Kubernetes. In some embodiments, the orchestrator may be hosted within an active data connector that may be hosted by any computing environment.

Figure 2A:
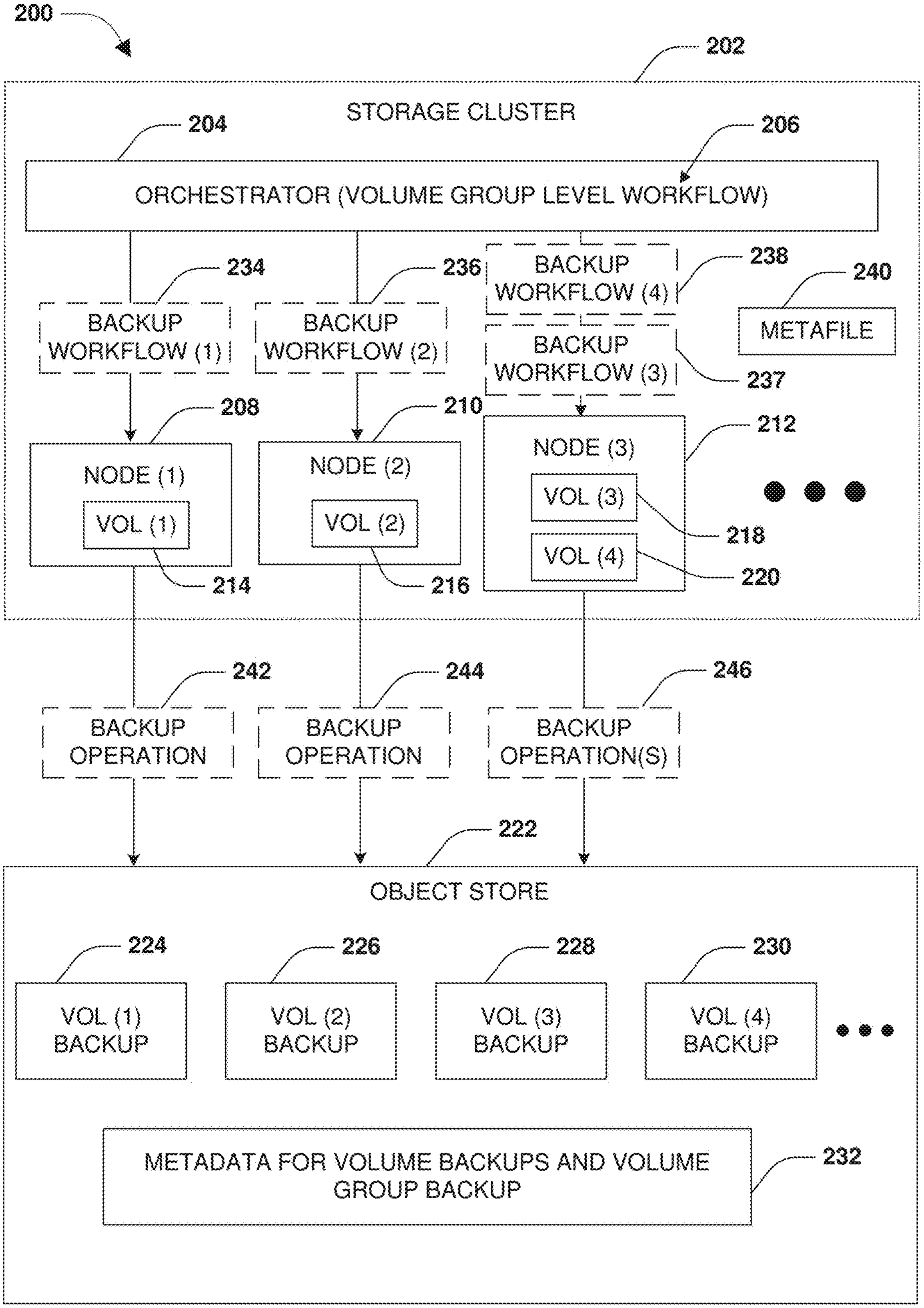
FIG. 2A is a block diagram illustrating an example system for orchestrating a volume group backup in accordance with various embodiments of the present technology.
Figure 2B:
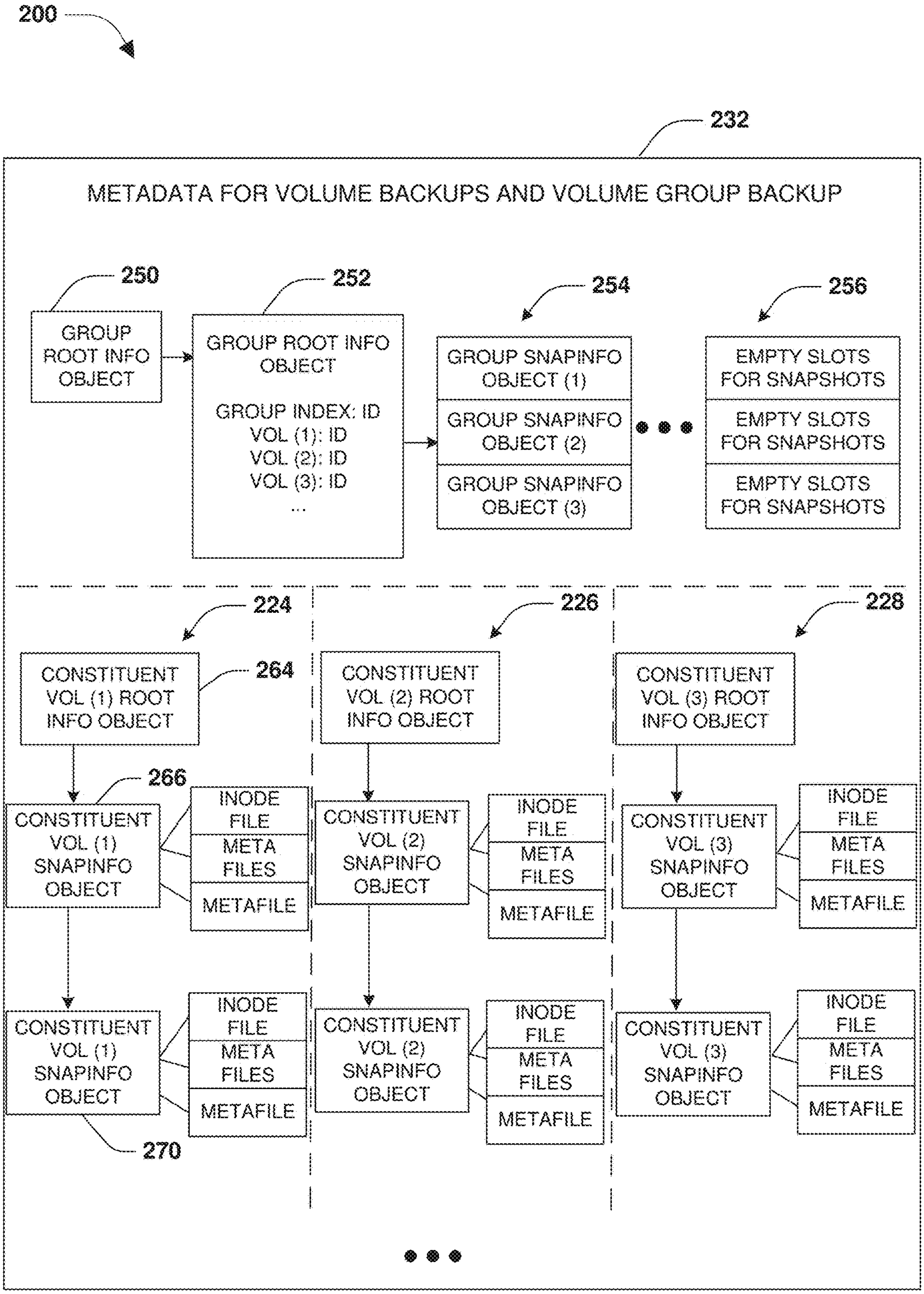
FIG. 2B is an illustration of an example of metadata associated with constituent volume backups and a volume group backup in accordance with various embodiments of the present technology.

FIG. 1 is a flow chart illustrating an example method for orchestrating a volume group backup, which is further described in conjunction with FIGS. 2A and 2B. A storage cluster 202 may comprise a plurality of nodes that provide storage management services for clients of the storage cluster 202. The plurality of nodes may comprise a first node 208, a second node 210, a third node 212, and/or other nodes that may be hosted as containers, serverless threads, servers, computing devices, hardware, software, or combinations thereof. The storage cluster 202 may host a volume group within which a client may store user data. The volume group may be composed of multiple constituent volumes such that data of the volume group may be stored across the multiple constituent volumes. Each node may host one or more of the constituent volumes. In some embodiments, the first node 208 hosts a first constituent volume 214 of the volume group. The second node 210 hosts a second constituent volume 216 of the volume group. The third node 212 hosts a third constituent volume 218 and a fourth constituent volume 220 of the volume group. A node may host any number of constituent volumes of the volume group.

In order to provide scalable, long term, and cost effective storage for backing up snapshots of the volume group, an orchestrator 204 may be configured to back up the volume group to an object store 222, such as a cloud computing environment. The orchestrator 204 may be hosted within the storage cluster 202 or external to the storage cluster 202. The orchestrator 204 may be hosted within an active data connector, a container, a serverless thread, a storage system hosting a storage operating system, etc.

During operation 102 of method 100, the orchestrator 204 may receive a request to create a volume group backup (a snapshot) of the volume group comprised of the set of constituent volumes stored across the nodes of a storage system hosting the storage cluster 202, such as the first constituent volume 214 hosted by the first node 208, the second constituent volume 216 hosted by the second node 210, the third constituent volume 218 and the fourth constituent volume 220 hosted by the third node 212, etc. The request may be triggered based upon a backup policy, an amount of time since a last backup, a command from a user to perform the backup, a retention count where a certain number of backups are to be maintained at any given point in time, etc. In some embodiments, the retention count can be dynamically changed. Decreasing the retention count could result in snapshot deletion so that there are not more snapshots being retained than the retention count. The retention count could be increased, but this may not result in a backup request, and a backup trigger will be based upon a backup policy or an API/CLI invocation (e.g., an application or user utilizing an API or command line interface to request the creation of a snapshot).

During operation 104 of method 100, the orchestrator 204 may generate a set of constituent volume backup workflows used as part of implementing the volume group backup to the object store 222. Each constituent volume workflow may be associated with a single constituent volume of the volume group. In some embodiments, a first constituent volume backup workflow 234 will be implemented by the first node 208 to back up the first constituent volume 214 to the object store 222 as a first constituent volume backup 224 (a first constituent volume snapshot). A second constituent volume backup workflow 236 will be implemented by the second node 210 to back up the second constituent volume 216 to the object store 222 as a second constituent volume backup 226 (a second constituent volume snapshot). A third constituent volume backup workflow 237 will be implemented by the third node 212 to back up the third constituent volume 218 to the object store 222 as a third constituent volume backup 228 (a third constituent volume snapshot). A fourth constituent volume backup workflow 238 will be implemented by the third node 212 to back up the fourth constituent volume 220 to the object store 222 as a fourth constituent volume backup 230 (a fourth constituent volume snapshot).

During operation 106 of method 100, a volume group level workflow 206 (a group backup workflow) may be generated by the orchestrator 204 to manage the orchestration and coordination of the nodes individually performing the constituent volume backup workflows to create a plurality of constituent volume backups constituting the volume group backup in the object store 222. As part of the orchestration, a group level state metafile may be created by the orchestrator 204. The group level state metafile may include a copy of a group root info object and group snapinfo objects. The group level state metafile may include transfer state information to prepare for and trigger execution of the constituent volume backup workflows by the nodes to back up the constituent volumes to the object store 222 as the constituent volume backups. The progress of backing up data of the constituent volumes to the object store 222 may be tracked using the transfer state information within the group level state metafile. If there is a failure or interruption, then the transfer state information may be evaluated to identify a last transfer of a constituent volume backup that failed so that the orchestration of the volume group backup can resume from that constituent volume backup instead of from the beginning. Thus, constituent volumes already backed up to the object store 222 are not re-backed up to the object store 222. In some embodiments, restarting the transfer uses transfer state information at a constituent volume level (along with the transfer state information at the group level). This is because each constituent volume are backed up independently and/or in parallel, and thus some constituent volumes could have completed while others were in progress, and thus the transfer state information at the constituent volume level is used to restart the transfers of the constituent volumes from where they were left off.

The volume group level workflow 206 may be implemented to manage the execution of the constituent volume backup workflows. In some embodiments, the volume group level workflow 206 may identify the first node 208 as hosting the first constituent volume 214 targeted by the first constituent volume backup workflow 234. The volume group level workflow 206 may instruct the first node 208 to execute the first constituent volume backup workflow 234 to perform a first backup operation 242 to back up the first constituent volume 214 to the object store 222 as the first constituent volume backup 224. Backup data of the first constituent volume backup 224 may be stored within slots of objects formatted according to an object format and stored within the object store 222. The volume group level workflow 206 may track progress and/or completion of the first constituent volume backup workflow 234 being implemented by the first node 208.

In a similar manner, the volume group level workflow 206 my identify and instruct the second node 210 to execute the second constituent volume backup workflow 236 to back up the second constituent volume 216 to the object store 222 as the second constituent volume backup 226 by performing a second backup operation 244. The volume group level workflow 206 my identify and instruct the third node 212 to execute the third constituent volume backup workflow 237 to back up the third constituent volume 218 to the object store 222 as the third constituent volume backup 228 by performing backup operations 246. The volume group level workflow 206 my identify and instruct the third node 212 to execute the fourth constituent volume backup workflow 238 to back up the fourth constituent volume 220 to the object store 222 as the fourth constituent volume backup 230 by performing the backup operations 246.

In some embodiments, each node may independently execute constituent volume backup workflows targeting constituent volumes hosted by each node. Thus, at least some of the constituent volume backup workflows may be implemented in parallel by the different nodes for improve throughput. In some embodiments of implementing a constituent volume backup workflow, a snapshot of a constituent volume is created by a node. Snapshot data of the snapshot is stored into slots of objects that are transferred to the object store 222 as part of a constituent volume backup for the constituent volume. Remote hard links within the constituent volume may be copied to the object store 222 as part of the constituent volume backup. The remote hard links may be keyed by an index. In some embodiments, an index within a directory entry represents a remote hard link that is added to entries within a directory metafile. In some embodiments, an index within an inode represents a primary path that is added to entries in an inode metafile. In some embodiments, a qtree record in a qtree metafile may be identified as comprising an index for a qtree name. The qtree record may be copied to the object store 222 as part of the constituent volume backup.

Because each constituent volume is individually and separately backed up to the object store 222 as individual and separate constituent volume backups by the various nodes of the storage cluster 202, additional metadata 232 and a metafile 240 must be created to stitch together the constituent volume backups to create the volume group backup (e.g., stitch together by defining associations and relationships from the constituent volumes to the volume group, and thus associations and relationships from the constituent volume backups to the volume group backup). During operation 108 of method 100, the metadata 232 is generated to stitch together the plurality of constituent volume backups, such as the first constituent volume backup 224, the second constituent volume backup 226, the third constituent volume backup 228, and the fourth constituent volume backup 230 as the volume group backup comprised of the plurality of constituent volume backups of the constituent volumes that make up the volume group.

As illustrated by FIG. 2B, the metadata 232 may comprise a group root info object 250. The group root info object 250 may represent a volume group endpoint within the object store 222. The group root info object 250 may point to a group root info object 252 comprising an index used to identify the constituent volumes of the volume group. The group root info object 252 may comprise entries for each of the constituent volumes of the volume group. These entries may be mapped to identifiers for the constituent volumes. The entries may point to group snapinfo objects 254 and/or empty slots 256 for snapshots (constituent volume backups) that may be subsequently created. A group snapinfo object may correspond to a constituent volume backup of a constituent volume of the volume group. The group snapinfo object may be populated with group properties of the volume group backup. The information within these objects may be used to locate and stitch together the individual constituent volume backups of the volume group.

The metadata 232 may comprise constituent volume root info objects per constituent volume endpoint within the object store 222. A first constituent volume root info object 264 may represent a constituent volume endpoint where constituent volume backups of the first constituent volume 214 are stored. The first constituent volume root info object 264 may point to one or more constituent volume snapinfo objects that each correspond to a constituent volume backup of the first constituent volume 214, such as a constituent volume snapinfo object 266 of the first constituent volume backup 224 of the first constituent volume 214, another constituent volume snapinfo object 270 of another constituent volume backup of the first constituent volume 214. A constituent volume snapinfo object may point to inode files, and/or various metafiles.

During operation 110 of method 100, the metafile 240 is created and maintained at the storage system hosting the storage cluster 202, as illustrated by FIG. 2A. The metafile 240 may be populated with a copy of the group root info object 250, the group root info object 252, and/or group snapinfo objects 254. Thus, the metafile 240 may be used to reference and access the volume group backup within the object store 222 based upon the metadata 232 (e.g., the copy of the group root info object 250, the group root info object 252, and/or group snapinfo objects 254 within the metafile 240 may be used to access the corresponding objects in the metadata 232). The metafile 240 may be populated with geometry information describing how the volume group is composed of the set of constituent volumes, and thus may be used to reference and access the volume group backup within the object store 222 based upon the metadata 232. In some embodiments, the geometry information may be stored within a group info structure within the group root info object 252. The group root info object 252 may also comprise a group type of the volume group and/or an array of identifiers of the constituent volumes that make up the volume group. If a constituent volume is added to or removed from the volume group, then the geometry information and/or the array of identifiers may be updated accordingly.

The orchestrator 204 may track completion of the constituent volume backup workflows. Once all constituent volume backup workflows have successfully completed and the metadata 232 and/or the metafile 240 have been created, then the orchestrator 204 may designate the backup of the volume group as the volume group backup as completed.

Figure 3:
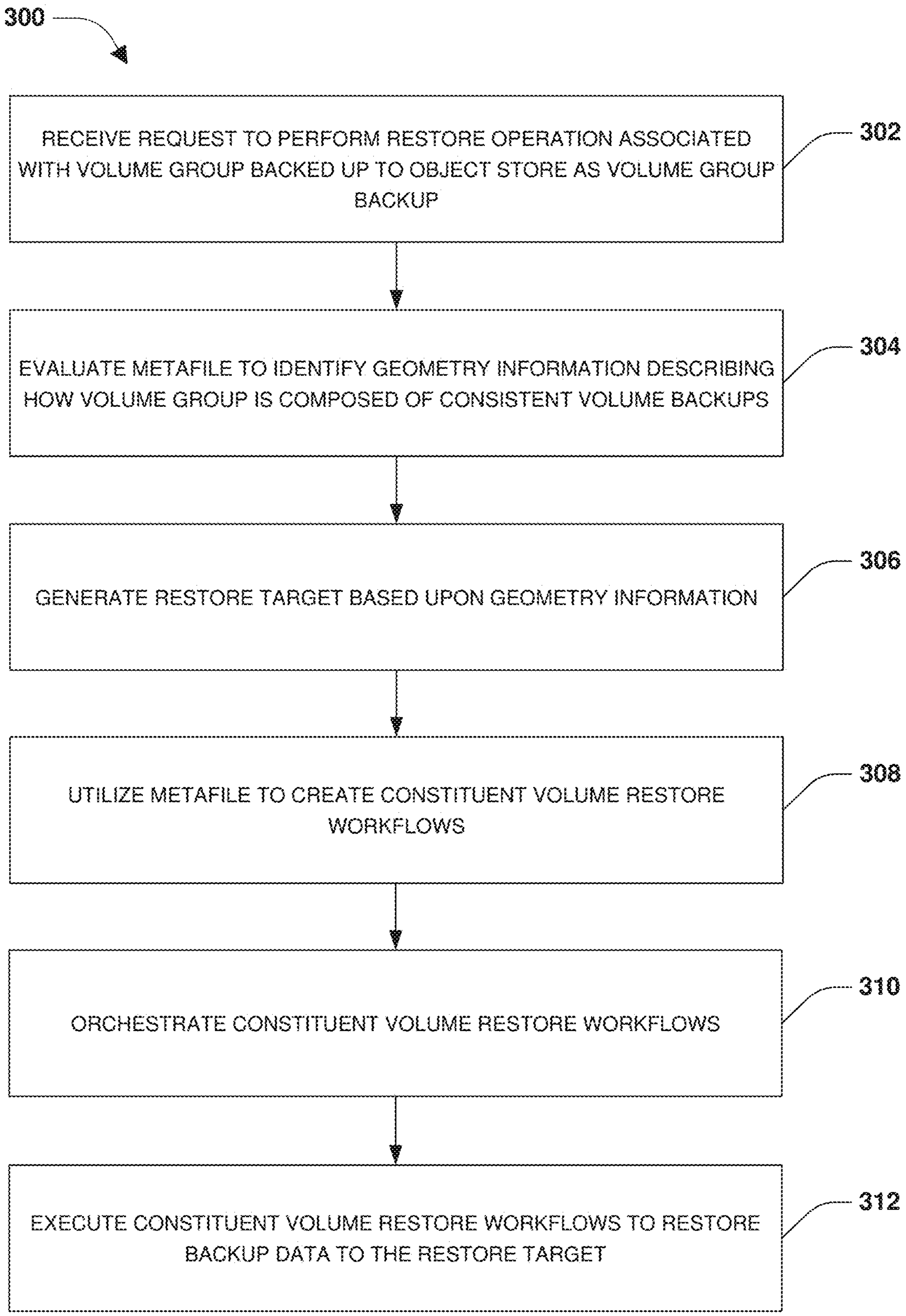
FIG. 3 is a flow chart illustrating an example method for orchestrating a volume group restore in accordance with various embodiments of the present technology.
Figure 4A:
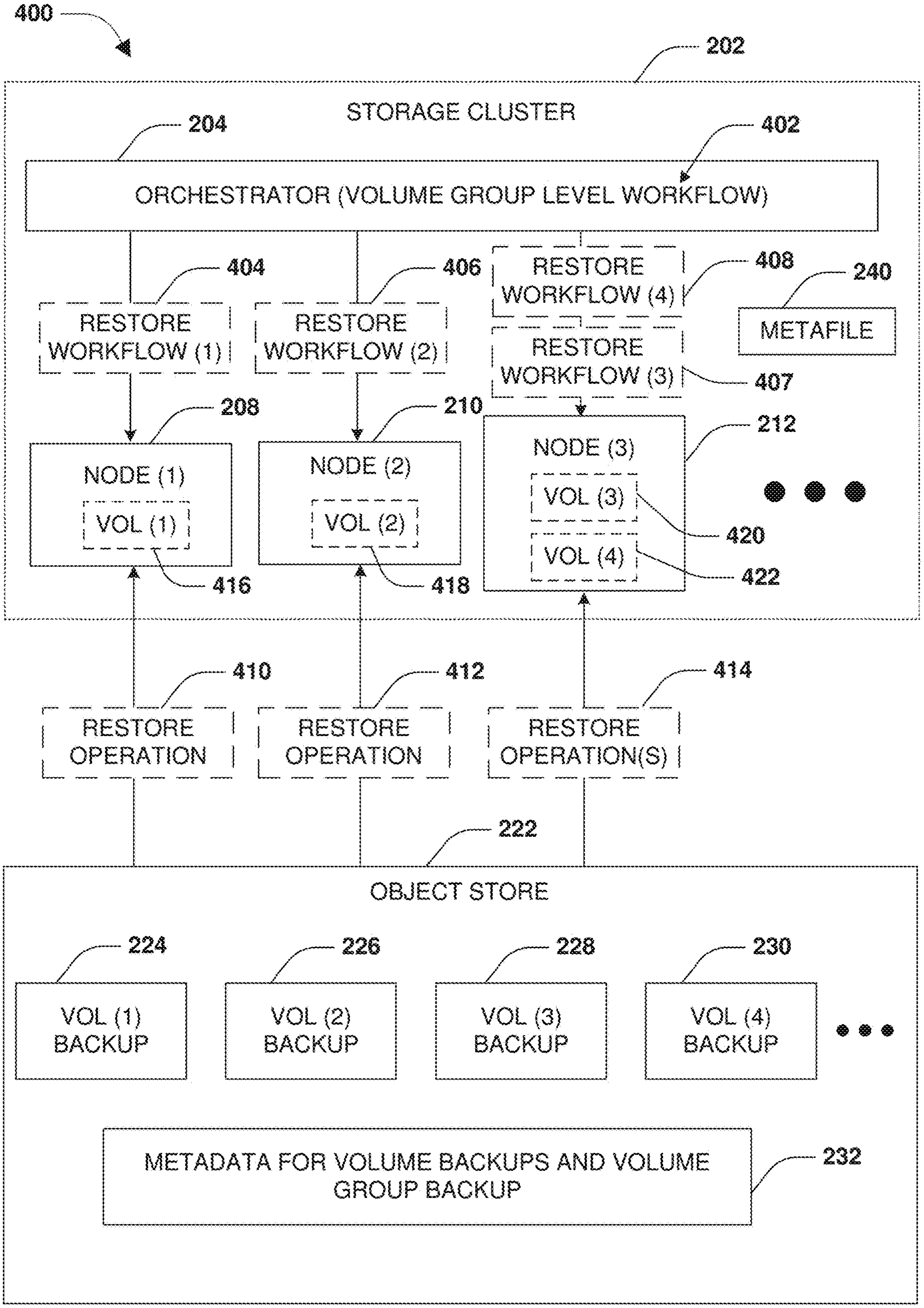
FIG. 4A is a block diagram illustrating an example system for orchestrating a volume group restore in accordance with various embodiments of the present technology.
Figure 4B:
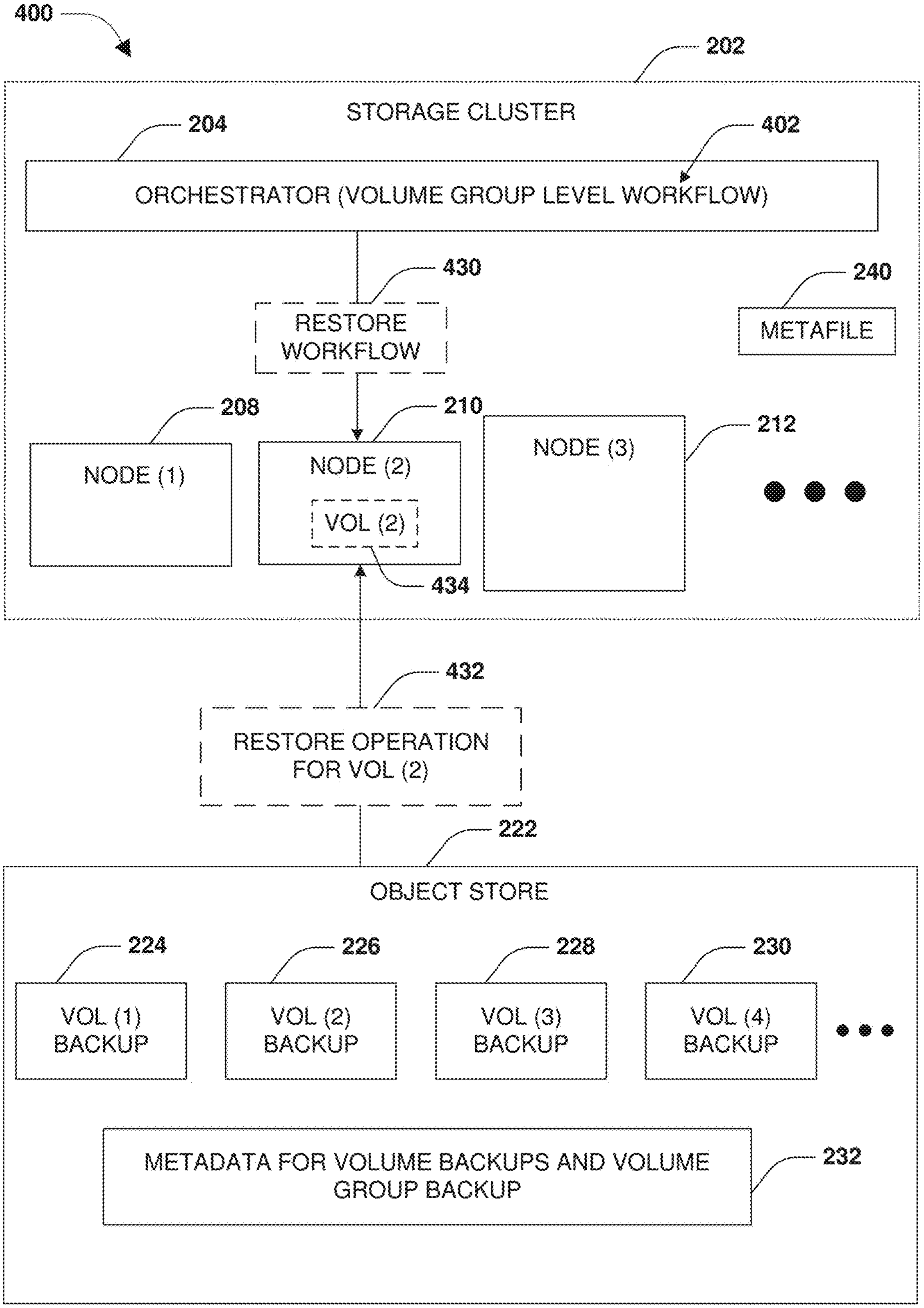
FIG. 4B is a block diagram illustrating an example system for restoring a subset of a volume group in accordance with various embodiments of the present technology.
Figure 4C:
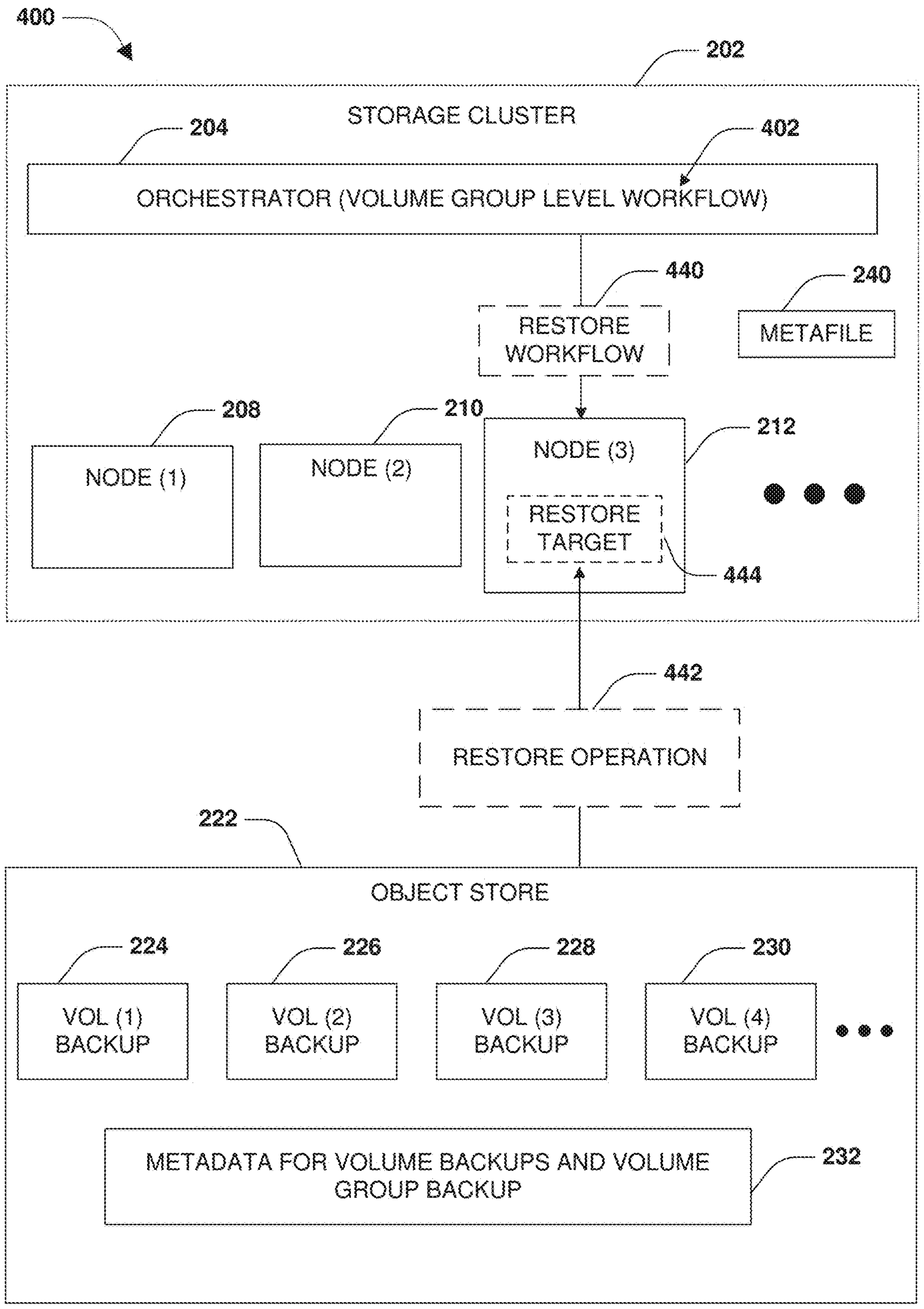
FIG. 4C is a block diagram illustrating an example system for restoring a subset of a volume group in accordance with various embodiments of the present technology.

FIG. 3 is a flow chart illustrating an example method for orchestrating a volume group restore, which is further described in conjunction with FIGS. 4A-4C. As previously discussed in relation to FIGS. 1, 2A, and 2B, the orchestrator 204 may have implemented the volume group level workflow 206 to orchestrate and coordinate the execution of constituent volume backup workflows to back up the constituent volumes of the volume group to the object store 222 as a volume group backup composed of the constituent volume backups 224, 226, 228, 230 stitched together by the metadata 232.

During operation 302 of method 300, the orchestrator 204 may generate a volume group level workflow 402 (a volume group restore workflow) to orchestrate and coordinate the execution of constituent volume restore workflows by the nodes of the storage cluster 202 to restore the volume group based upon receiving a request to perform a restore operation for the volume group. During operation 304 of method 300, the orchestrator 204 may evaluate the metafile 240 to identify geometry information describing how the volume group is composed of the set of constituent volumes backed up to the object store 222 as the constituent volume backups.

During operation 306 of method 300, the orchestrator 204 may utilize the geometry information to generate a restore target mirroring the geometry of the volume group (e.g., 4 restore constituent volumes may be generated as restore targets of the 4 constituent volume backups). In some embodiments, the restore target may correspond to the entire volume group, as illustrated by FIG. 4A, and thus the restore target may comprise a restore volume group composed to a first restore constituent volume 416 corresponding to the first constituent volume 214, a second restore constituent volume 418 corresponding to the second constituent volume 216, a third restore constituent volume 420 corresponding to the third constituent volume 218, and a fourth restore constituent volume 422 corresponding to the fourth constituent volume 220. In some embodiments, the restore target may correspond to a subset of the volume group such as a single constituent volume (or less than all constituent volumes of the volume group), as illustrated by FIG. 4B. In some embodiments, the restore target may correspond to a subset of the volume group such as a directory, a file, a qtree, or other subset of the volume group.

During operation 308 of method 300, the orchestrator 204 may create constituent volume restore workflows based upon information within the metafile 240. Each constituent volume restore workflow may correspond to a constituent volume backup that will be restored by a node as a restore constituent volume. In some embodiments, a first constituent volume restore workflow 404 is created for the first node 208 to execute to restore the first constituent volume 214 as the first restore constituent volume 416 using a restore operation 410 to restore backup data from the first constituent volume backup 224. A second constituent volume restore workflow 406 is created for the second node 210 to execute to restore the second constituent volume 216 as the second restore constituent volume 418 using a restore operation 412 to restore backup data from the second constituent volume backup 226. A third constituent volume restore workflow 407 is created for the third node 212 to execute to restore the third constituent volume 218 as the third restore constituent volume 420 using a restore operations 414 to restore backup data from the third constituent volume backup 228. A fourth constituent volume restore workflow 408 is created for the third node 212 to execute to restore the fourth constituent volume 220 as the fourth restore constituent volume 422 using the restore operations 414 to restore backup data from the fourth constituent volume backup 230.

The constituent volume restore workflows may be generated using the information within the metafile 240. In some embodiments, a constituent volume restore workflow for a constituent volume may be generated using the geometry information (e.g., a geometry of the volume group such as a number of constituent volumes, sizes of the constituent volumes, etc.), a group root info object representing a volume group endpoint within the object store 222, a constituent volume root info object of a constituent volume endpoint where constituent volume backups of the constituent volume are located, a group snapinfo object corresponding to a particular constituent volume backup of the constituent volume (e.g., a group snapinfo object of volume group information relating to group properties of the volume group backup), and/or other information related to the constituent volume backups and the volume group backup.

During operation 310 of method 300, the volume group level workflow 402, implemented as a group restore workflow, is used to orchestrate (e.g., track and manage execution of the constituent volume restore workflows) the constituent volume restore workflows by the nodes. During operation 312 of method 300, each of the nodes may independently (e.g., and in parallel) restore the constituent volumes of the restore volume group as the restore constituent volumes constituting the restore volume group. In response to the group restore workflow determining that all of the constituent volume restore workflows successfully complete, the group restore workflow may be updated to indicate that the restore volume group has been successfully restored.

In some embodiments, the orchestrator 204 may support various restore granularities for the volume group, such as restoring the entire volume group, restoring a single constituent volume, restoring less than all of the constituent volumes of the volume group, a single file of the volume group, a directory of the volume group, a qtree of the volume group, etc. These restore operations may be performed as incremental restores where merely the difference between what data is currently stored at a restore target and what data is to be restored to the restore target is actually restored from the object store 222 to the restore target. In some embodiments, a difference between a current version of a constituent volume and a backed up version of the constituent volume may be applied to the current version of the constituent volume so that the constituent volume mirrors the backed up version of the constituent volume.

These restore operations may be performed on-demand while users are provided with access to the restore target during the restore operations (e.g., a user can access already restored data through the restore target, and not yet restored data may be retrieved and restored on-demand for access during the restore operation). FIG. 4B illustrates the second node 210 implementing a constituent volume restore workflow 430 to perform a single constituent volume restore of the second constituent volume 434 using a restore operation 432. FIG. 4C illustrates the third node 212 implementing a constituent volume restore workflow 440 to restore a subset of the volume group (e.g., a directory or single file restore) to a restore target 444 using a restore operation 442.

In some embodiments, the metafile 240 and the metadata 232 may be utilized by an active data connector to identify volume group backups (volume group snapshots), constituent volume backups (volume snapshots), and/or content within the backups, such as files, directories, qtrees, etc. In this way, the active data connector may provide snapshot browsing functionality of snapshots backed up to the object store 222, such as through a graphical user interface. Using the snapshot browsing functionality, a user may visually navigate through volume group backups, constituent volume backups, and/or the content within the backups in order to perform restore operations at various granularities such as a single file restore, a directory restore, a qtree restore, a volume restore, a volume group restore, etc.

Figure 5:
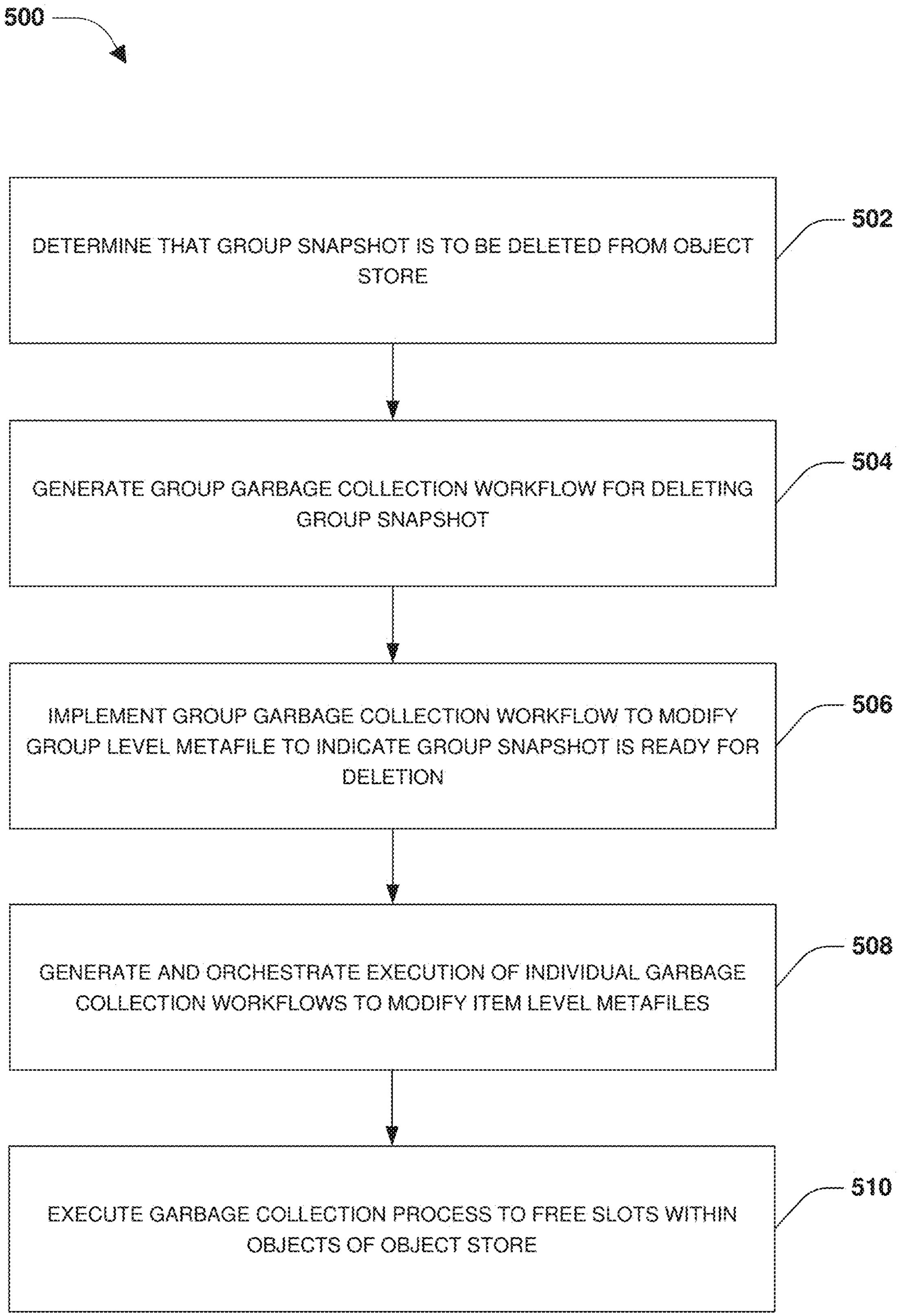
FIG. 5 is a flow chart illustrating an example method for orchestrating volume group garbage collection in accordance with various embodiments of the present technology.
Figure 6:
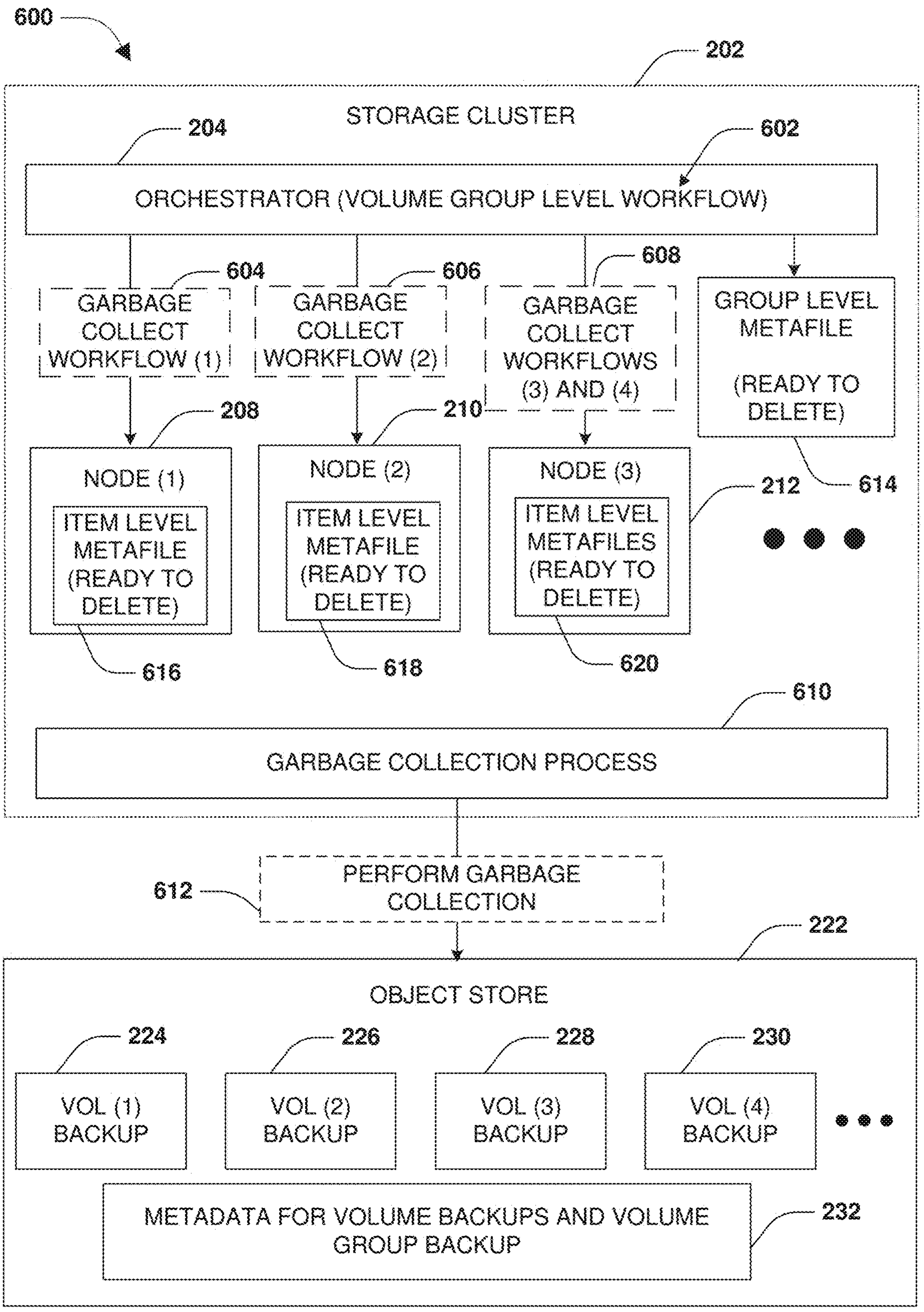
FIG. 6 is a block diagram illustrating an example system for orchestrating volume group garbage collection in accordance with various embodiments of the present technology.

FIG. 5 is a flow chart illustrating an example method for orchestrating a garbage collection, which is further described in conjunction with FIG. 6. As previously discussed in relation to FIGS. 1, 2A, and 2B, the orchestrator 204 may have implemented the volume group level workflow 206 to orchestrate and coordinate the execution of constituent volume backup workflows to back up the constituent volumes of the volume group to the object store 222 as a volume group backup composed of the constituent volume backups 224, 226, 228, 230 stitched together by the metadata 232. The orchestrator 204 may be configured to orchestrate a garbage collection process when the volume group backup is to be deleted in order to free snapshot data in slots of objects based upon the snapshot data being unique to the volume group backup and not being shared with other backups (snapshots) stored within the object store 222. The orchestrator 204, a volume group level workflow 602 (a group garbage collection workflow), and/or garbage collection workflows implemented by the nodes may be executed through serverless threads, containers of a container orchestration platform (e.g., Kubernetes), an active data connector, and/or a storage system hosting a storage operating system.

During operation 502 of method 500, a determination is made that the volume group backup (a group snapshot or volume group snapshot) is to be deleted from the object store 222. The volume group backup may be deleted for various reasons such as based upon a retention policy, an amount of time since the volume group backup was created, at the request of a client, a certain number of volume group backups within the object store 222 for the volume group being reached, etc. Accordingly, the volume group level workflow 602 is implemented as the group garbage collection workflow for deleting the volume group backup, during operation 504 of method 500. The group garbage collection workflow is implemented by the orchestrator 204 to modify a group level metafile 614 to indicate that the volume group backup is ready for deletion, during operation 506 of method 500. Modifying the group level metafile 614 will provide an indication to stop applications and services from using the volume group backup (e.g., a restore service may be blocked from performing a restore operation using the volume group backup). In response to modifying the group level metafile 614, a flag may be set within bookkeeping information to a value that causes a garbage collection process 610 to skip garbage collecting group snapshot objects of the volume group backup (e.g., the group root info object 250, the group root info object 252, the group snapinfo objects 254, and/or other objects within the metadata 232). This will block the garbage collection process 610 from freeing/remove these group snapshot objects from the object store 222.

In response to setting the flag, a volume group state is marked as cloud dirty to indicate that modifications to the group snapshot objects (e.g., the group root info object 250, the group root info object 252, the group snapinfo objects 254, and/or other objects within the metadata 232) are pending to be made in the object store 222. Once the volume group state is marked as cloud dirty, the group snapshot objects of the volume group backup are updated within the object store 222 to indicate that the volume group backup is being deleted and/or is ready for garbage collection. In response to updating the group snapshot objects of the volume group backup, the volume group state is marked as cloud clean to indicate that there are no more pending updates to the group snapshot objects.

During operation 508 of method 500, a set of individual garbage collection workflows are generated for the constituent volume backups of the volume group backup. A first garbage collection workflow 604 is created for the first constituent volume backup 224 of the first constituent volume 214. A second garbage collection workflow 606 is created for the second constituent volume backup 226 of the second constituent volume 216. Third and fourth garbage collection workflows 608 are created for the third constituent volume backup 228 of the third constituent volume 218 and for the fourth constituent volume backup 230 of the fourth constituent volume 220.

As part of the operation 508 of method 500, the orchestrator 204 utilizes the group garbage collection workflow to orchestrate the execution of the garbage collection workflows by the nodes that created the corresponding constituent volume backups within the object store 222. The first node 208 may implement the first garbage collection workflow 604 to modify a first item level metafile 616 for the first constituent volume backup 224 to indicate that the first constituent volume backup 224 is ready for deletion. The second node 210 may implement the second garbage collection workflow 606 to modify a second item level metafile 618 for the second constituent volume backup 226 to indicate that the second constituent volume backup 226 is ready for deletion. The third node 212 may implement the garbage collection workflows 608 to modify item level metafiles 620 for the third constituent volume backup 228 and the fourth constituent volume backup 230 to indicate that the third constituent volume backup 228 and the fourth constituent volume backup 230 are ready for deletion. Execution of the garbage collection workflows may modify constituent volume objects of the constituent volume (e.g., constituent volume root info objects, constituent volume snapinfo objects, etc.).

In response to receiving notifications from the nodes that all item level metafiles have been modified to indicate that the constituent volume backups are ready for deletion, the flag within the bookkeeping information is set to a value to cause the garbage collection process 610 to free slots within objects of the object store that store backup data (snapshot data) unique to the volume group backup and not shared with other backups (snapshots). Because an object may comprise snapshot data referenced by multiple snapshots (backups), data referenced by the volume group backup may also be referenced by other snapshots (backups), and thus that data is not freed by the garbage collection process 610.

In this way, the garbage collection process 610 is executed to garbage collect 612 the volume group backup, during operation 510 of method 500. Modifying the flag within the bookkeeping information may cause the garbage collection process 610 to process the group snapshot objects of the volume group backup. In response to modifying the flag, the group snapshot objects of the volume group backup may be updated within the object store 222. In response to updating the group snapshot objects, the volume group state may be set to cloud clean.

If there is a failure or interruption, the deletion and garbage collection of the volume group backup can be restarted from where the deletion and garbage collection left off. When the determination is made that the volume group backup is to be deleted, a snapshot state for the volume group backup is read from the group level metafile 614. In response to the snapshot state being set to indicate that the group volume backup is ready for deletion, a determination is made as to whether the group volume state is marked as cloud dirty. If the group volume state is marked as cloud dirty and the flag within the bookkeeping information is set to the value to cause the garbage collection process 610 to skip garbage collecting the group snapshot objects of the volume group backup, then the group snapshot objects are updated within the object store 222 and execution of the individual garbage collection workflows is orchestrated by the orchestrator 204. If the group volume state is marked as cloud dirty and the flag is set to the value that causes the garbage collection process to garbage collect the group snapshot objects, then the group snapshot objects are updated within the object store 222 and execution of the individual garbage collection workflows is skipped because the individual garbage collection workflows were already performed. If the group volume state is marked as cloud clean and not cloud dirty, then execution of the individual garbage collection workflows is orchestrated by the orchestrator 204 based upon the flag being set to indicate that garbage collection process 610 is to skip garbage collecting the group snapshot objects. If the group volume state is marked as cloud clean and not cloud dirty, then deletion of the group volume backup is terminated based upon the flag within the bookkeeping information not being set to indicate that garbage collection process 610 is to skip garbage collecting the group snapshot objects. In this way, if the snapshot state already indicates that the volume group backup is ready for deletion when the request is received, then a determination is made that a prior deletion process failed to complete and is restarted from where the prior deletion process left off.

Figure 7:
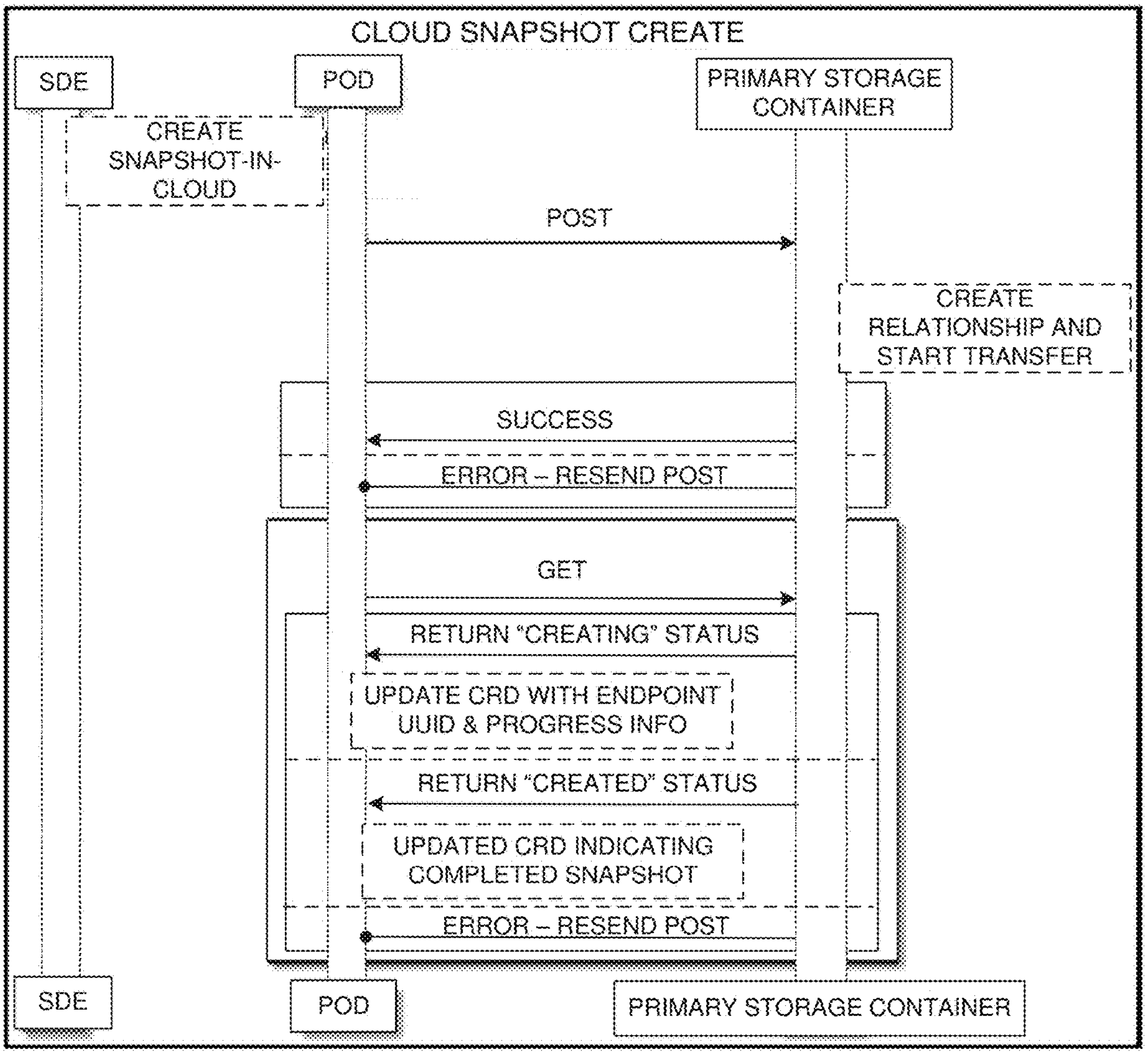
FIG. 7 is a block diagram illustrating an example system for creating a snapshot within a remote object store.
Figure 8:
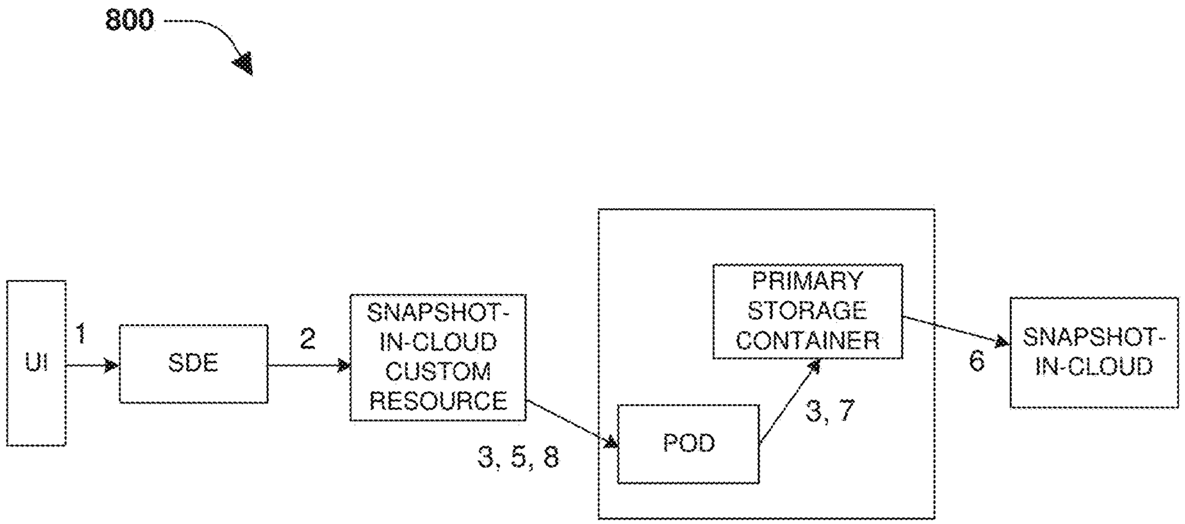
FIG. 8 is a component block diagram illustrating an example system for implementing requests associated with objects stored within a remote object store.

FIGS. 7 and 8 depict examples 700, 800 of snapshot creation of a snapshot that be used by an on-demand restore process. In an embodiment, a user selects a volume, and requests creation of a snapshot-in-cloud. An engine (e.g., a client) creates a CR for the snapshot-in-cloud (e.g., a custom resource (CR) records the snapshot-in-cloud UUID provided by the engine). Container manager (e.g., a component/module implemented by software, hardware, or combination there) picks up the custom resource (CR) for Cloud Snapshot creation and sends a POST to a primary storage container to start the transfer. A POST payload includes the following: cloud bucket info and credentials (bucket info, secret/access) and Snapshot UUID. The primary storage container does the following upon receiving the request: creates a mirroring relationship if not present; creates or recreates object store configuration if not present or if information has changed; triggers a 'mirror update' or 'mirror initialize' depending on whether this was the first time snapshot-in-cloud was created or this is a subsequent creation; any failure in the above steps will return an error to POST response. The Container manager updates CR with some indication that transfer is 'in progress' so that the Container manager will now start sending a GET. A mirror transfer is started and automatically creates a Snapshot on the source volume to replicate to the cloud bucket. UUID for the Snapshot is supplied by the engine, and the Snapshot on the volume will be stamped with this same UUID. Once a snapshot-in-cloud is created for a volume, there will be a single Snapshot on the source volume while transfer is idle, and two such Snapshots while the transfer is running. The Snapshot (Volume Snapshot) is stamped with the same UUID. The Container manager polls a primary storage container using a GET which returns: Status Creating, created or an error, bytes transferred, transfer progress in % (to be stored in CRD), endpoint UUID (to be stored in CRD), logical space (to be stored in CRD). When transfer completes, the Container manager updates the CRD indicating Snapshot-in-cloud is created.

Figure 9:
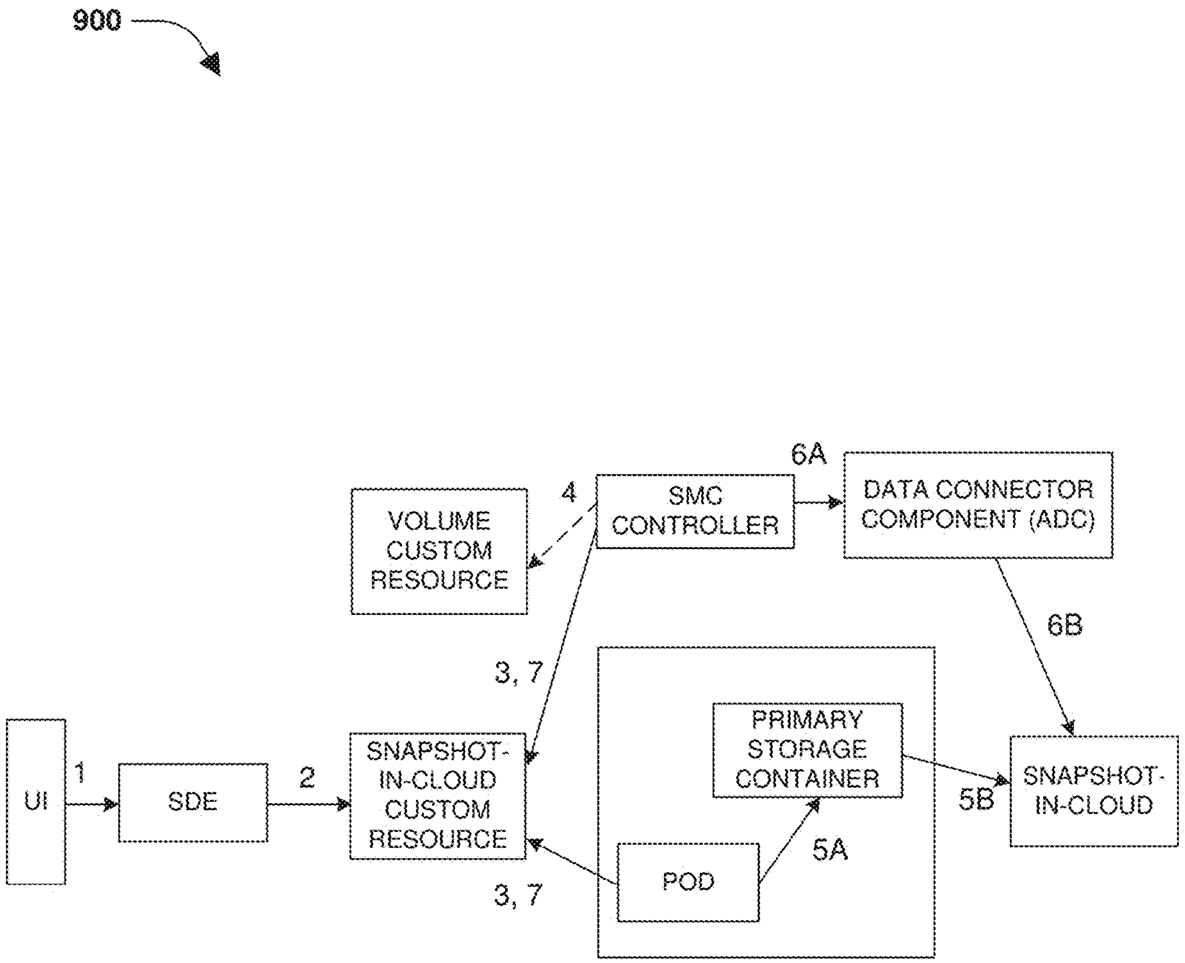
FIG. 9 is a component block diagram illustrating an example system for implementing requests associated with objects stored within a remote object store.

FIG. 9 depicts an example 900 of snapshot management utilizing a data connector component (ADC), such as deleting a snapshot. In an embodiment, a user selects a Snapshotin-cloud to delete from the UI. An engine (via Client) deletes the Snapshot-in-cloud CR. The Container manager and SMC Controller detects the Snapshot-in-cloud CR deletion. The SMC Controller checks to see whether the Volume CR is present or not. If the Volume CR is present, this indicates that the Container manager is still alive and allows Container manager to handle the Snapshot-in-cloud deletion. If the Volume CR is gone, SMC Controller handles the deletion. If the Volume CR is present: Container manager repeatedly sends DELETE REST request to primary storage container until complete (i.e., return HTTP Status 404); and primary storage container asynchronously deletes the objects associated with individual Snapshot-in-cloud or the endpoint from the bucket. If the Volume CR not is present: SMC Controller sends DELETE REST request to data connector component (ADC) until complete (i.e., returns HTTP Status 404); and the ADC either marks the Snapshot-in-cloud as deleted or asynchronously deletes the endpoint (all objects) from the bucket. Once the Container manager or SMC Controller receives a NOT FOUND response from primary storage container/ADC respectively, the finalizer is removed from the Snapshot-in-cloud CR, allowing the CR to be completely removed.

Figure 10:
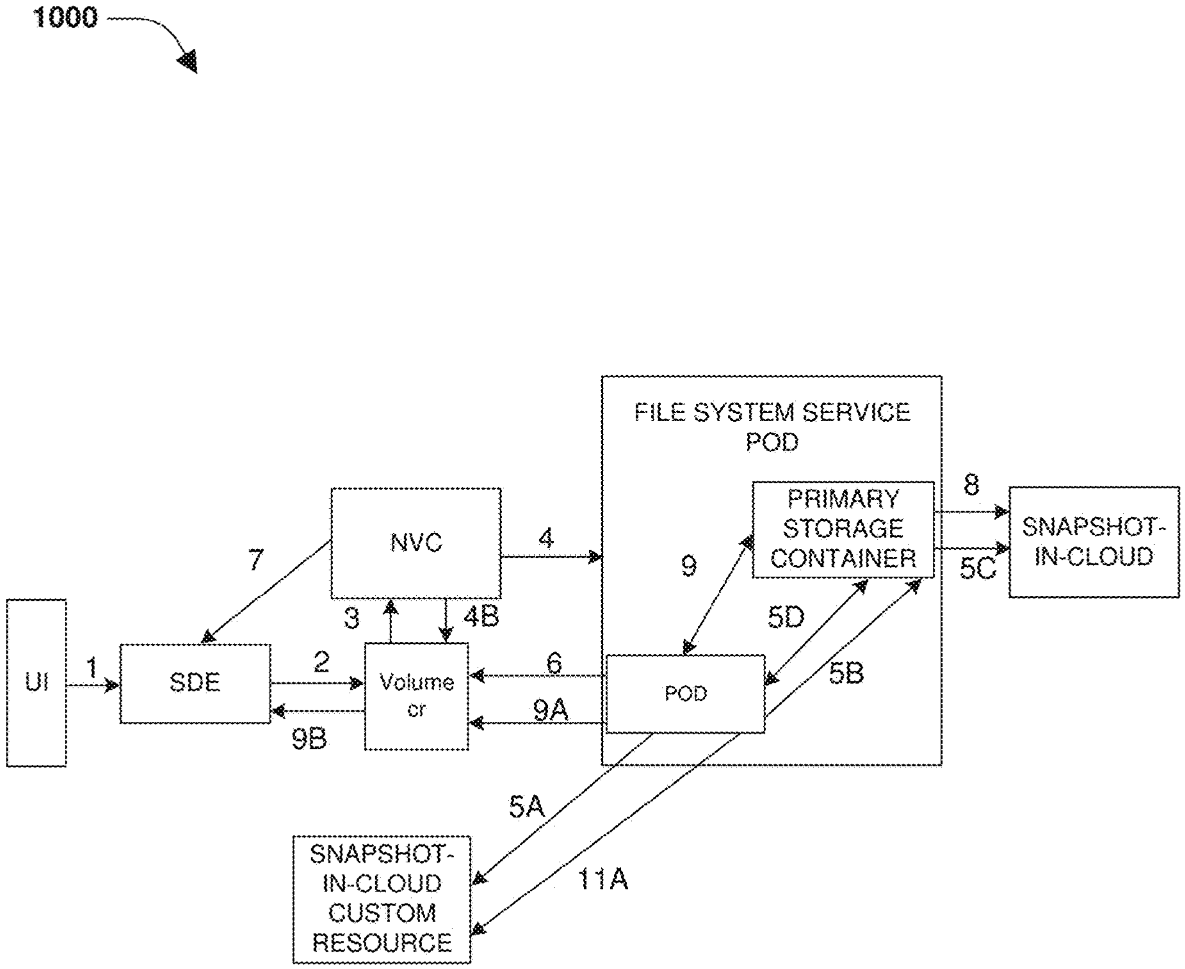
FIG. 10 is a component block diagram illustrating an example system for implementing requests associated with objects stored within a remote object store.

FIG. 10 depicts an example 1000 of snapshot management, such as performing a snapshot restore by an on-demand restore process. In an embodiment, a user selects the cloud snapshot in the front end which is to be restored. The engine creates a Volume Custom Resource (CR) to be used for Cloud Snapshot Restore. This CR stores the cloud snapshot UUID. The client picks up the Volume CR to be used to create the CONTAINER MANAGER. In some embodiments, the space needed for the restored primary storage container is 30% more than the logical space of the cloud snapshot. The client creates a new CONTAINER MANAGER based on the Volume CR. Based on the Snapshot-in-cloud UUID present in the Volume CR, the primary storage container volume will be created as a DP volume used for OnDemand restore. The client updates the volume status in the Volume CR after the CONTAINER MANAGER creation is successful. In some embodiments, the volume is not usable by the clients at this point. Volume GET returns 'offline' state at this point.

Container manager (from the CONTAINER MANAGER created), picks up the endpoint details from the Snapshot-in-cloud CR and issues REST calls to the primary storage container to start Ondemand restore. The container manager updates the Snapshot-in-cloud CR by incrementing a refcount to prevent deletion of the CR. The container manager sends a PATCH request to a primary storage container with an endpoint and cloud snapshot details (REST API details). The primary storage container issues Ondemand restore to the DP volume from the cloud snapshot. The container manager keeps polling the primary storage container for Ondemand restore progress using GET calls.

While restore is in the setup phase, a state of 'preparing' will be return. Once this changes to 'restoring', the volume is considered mountable by the client. The container manager updates the Ondemand restore progress in the Volume CR. Once GET returns a 'restoring' state, the container manager updates the Volume CR to indicate that volume is ready to be mounted. The container manager sets 'restoring' and 'online' state in Volume CR. The primary storage container converts the DP volume to Read-Write. The volume can be used by the clients. The volume remains an Ondemand volume and clients may observe lower performance. The client creates a VolumeOnline event which is picked up by the engine and the volume is shown as online in the front end UI. Primary storage container starts the phase 2 scanner (data pull) automatically. Container manager polls the primary storage container using REST calls to get the phase 2 scanner progress and updates the Volume CR. Once all the data is pulled, primary storage container converts the Ondemand volume to a normal volume. The performance limitations no longer apply and the volume performs like any read/write volume. Once the transfer completes the container manager is assigned a 'restored' state. The container manager decrements the refcount from the Snapshot-in-cloud CR.

Figure 11A:
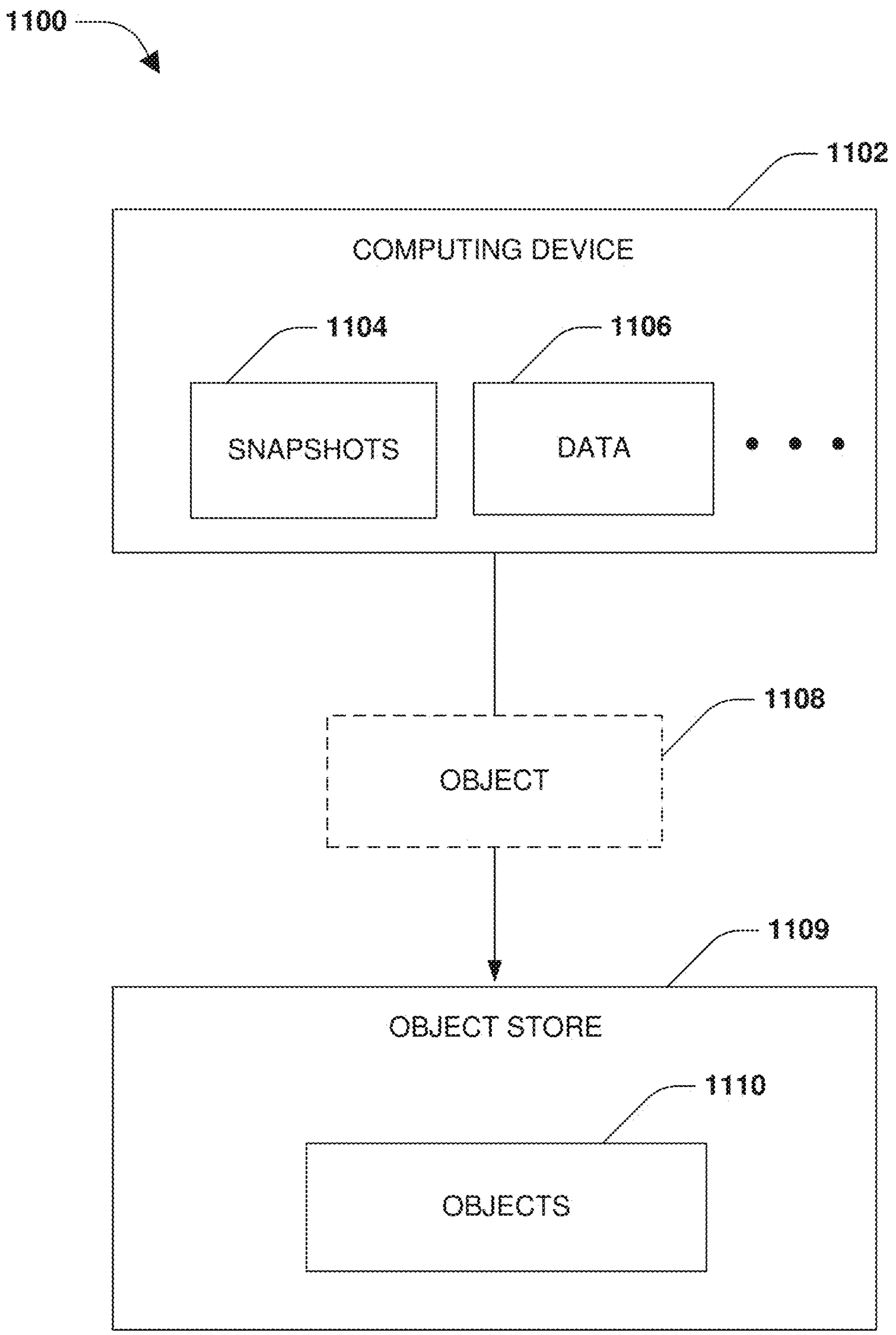
FIG. 11A is a component block diagram illustrating an example system for managing objects within an object store using an object file system.

FIG. 11A illustrates a system 1100 for managing objects within an object store (a remote object store) using an object file system. The objects may store snapshot data of snapshots that can be restored on-demand to an on-demand volume using a restore process (e.g., an on-demand restore process) such that clients are provided with access to the snapshot data during and before completion of the restore process. A computing device 1102 may comprise a node, a storage controller, a storage service, an on-premises computing device, a storage virtual machine, or any other hardware or software. The computing device 1102 may store data 1106 within storage devices (primary storage) managed by the computing device 1102. The computing device 1102 may provide client devices with access to the data 1106, such as by processing read and write operations from the client devices. The computing device 1102 may create snapshots 1104 of the data 1106, such as a snapshot of a file system of a volume accessible to the client devices through the computing device 1102. The computing device 1102 may be configured to communicate with an object store 1109 over a network. The object store 1109 may comprise a cloud computing environment remote to the computing device 1102.

As provided herein, an object file system and object format is provided for storing and accessing data, such as snapshots, stored within objects in the object store 1109. The data 1106, maintained by the computing device, is stored into a plurality of slots of an object 1108. Each slot represents a base unit of data of the object file system defined for the object store 1109. For example, the object 1108 comprises or any other number of slots (e.g., 1024 slots), wherein each slot comprises 11 kb of data or any other amount of data. It may be appreciated that objects may comprise any number of slots of any size. User data, directory blocks, metadata, and/or inofile blocks of an inofile comprising per inode metadata is stored into the slots of the object 1108. In some embodiments, snapshot data, of a snapshot created by the computing device 1102 of a file system maintained by the computing device 1102, is stored into the object 1108. For example, the object 1108 may be maintained as an independent logical representation of the snapshot, such that data of the snapshot is accessible through the object 1108 without having to reference other logical copies of other snapshots stored within objects 1110 of the object store 1109. In some embodiments, the data is converted from physical data into a version independent format for storage within the object 1108.

In some embodiments, the object 1108 is created to comprise data in a compressed state corresponding to compression of the data within the primary storage of the computing device 1102. In this way, compression used by the computing device 1102 to store the data is retained within the object 1108 for storage within the object store 1109. The object 1108 may be assigned a unique sequence number. Each object within the object store 1109 is assigned unique sequence numbers.

An object header may be created for the object 1108. The object header comprises a slot context for slots within the object 1108. The slot context may comprise information relating to a type of compression used for compressing data within the object 1108 (if any compression is used), a start offset of a slot, a logical data length, a compressed data length, etc. The slot context may be used to access compressed data stored within the object 1108.

Figure 11B:
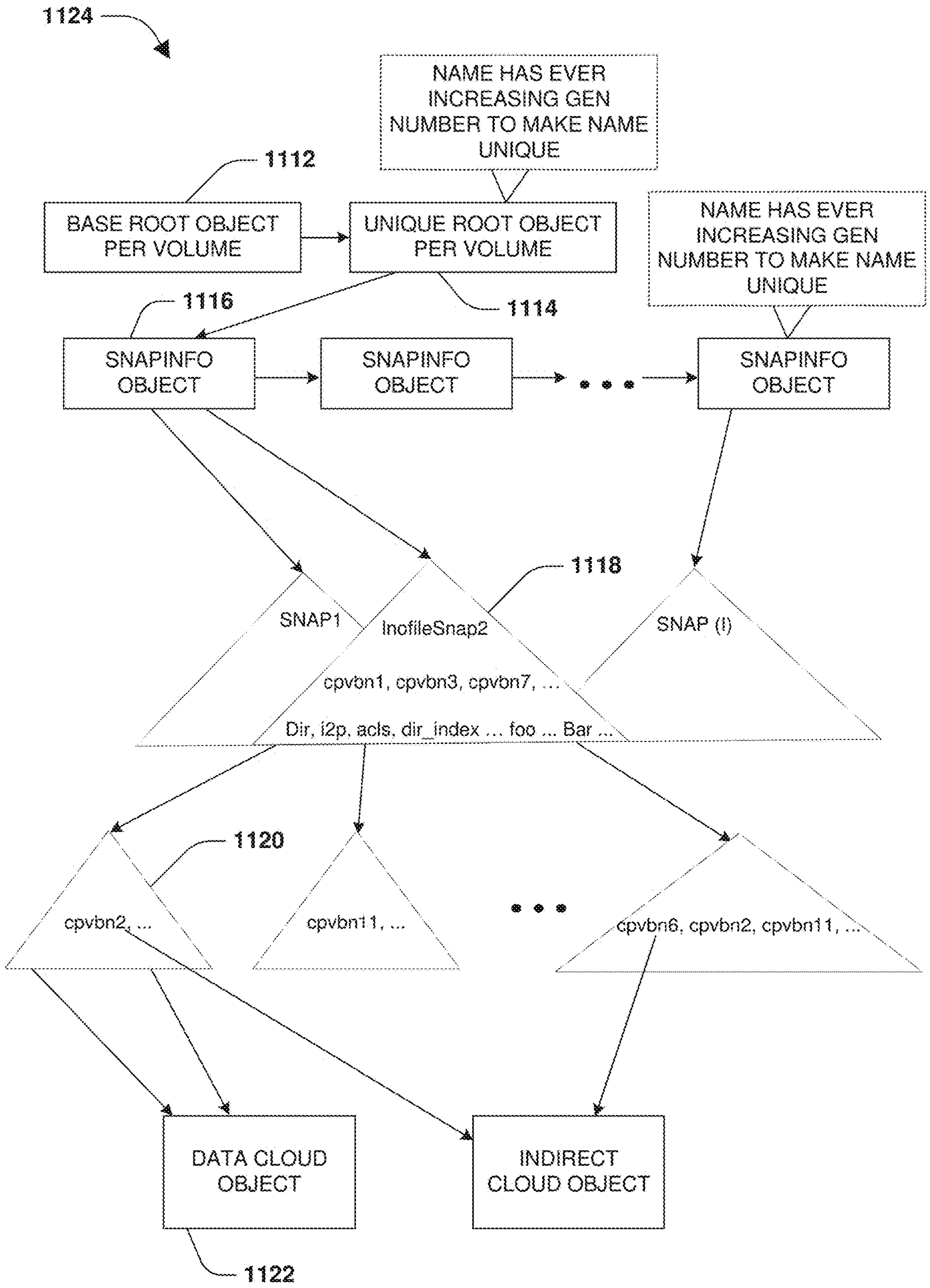
FIG. 11B is an example of a snapshot file system within an object store.
Figure 11C:
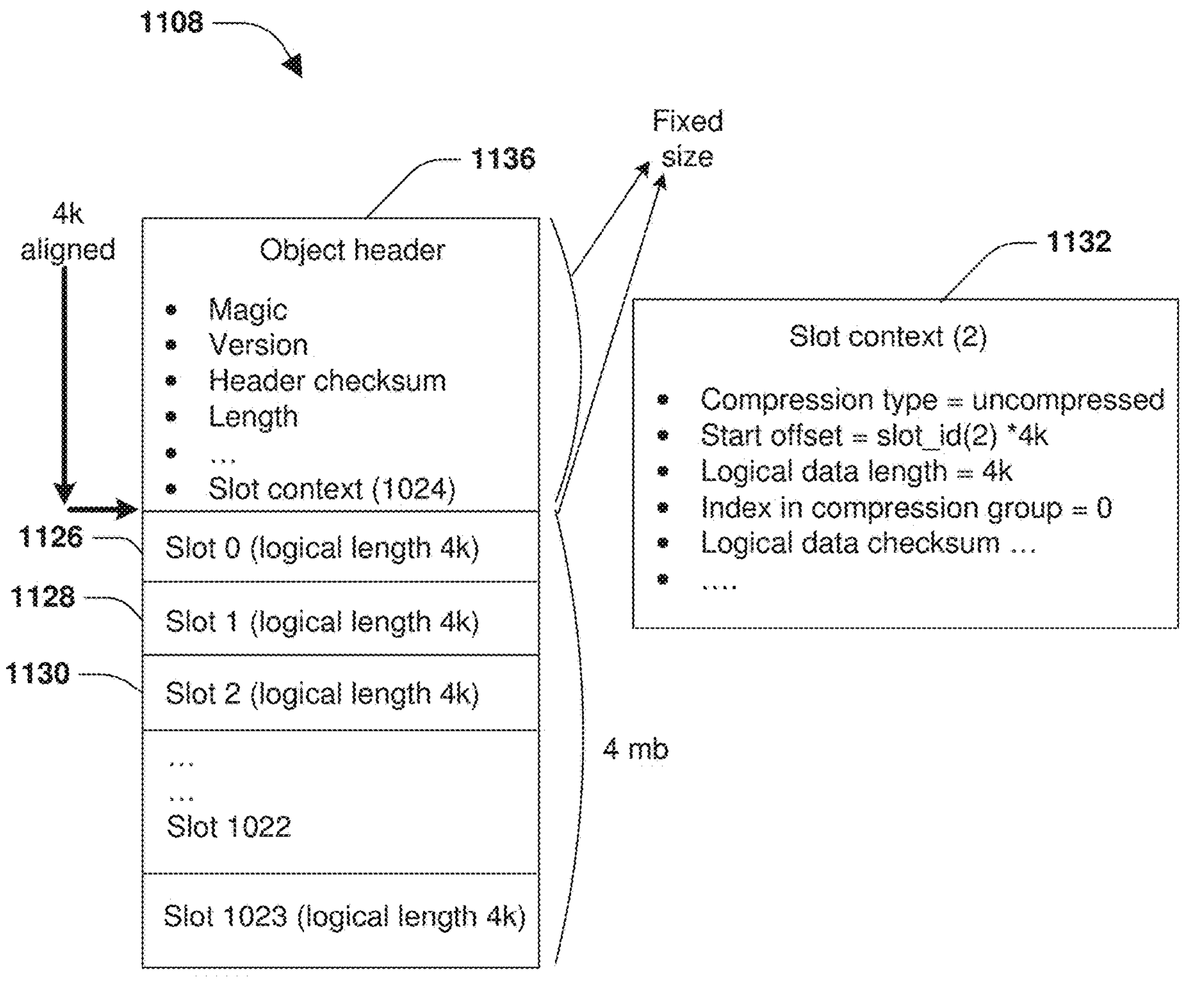
FIG. 11C is an example of an object stored within an object store.

FIG. 11C illustrates an example of the object 1108. The object 1108 comprises an object header 1136 and a plurality of slots, such as a slot 1126, a slot 1128, a slot 1130, and/or any other number of slots. The object header 1136 may have a size that is aligned with a start of the plurality of slots, such as having a 11 kb alignment based upon each slot having a logical length of 11 kb. It may be appreciated that slots may have any length. The object header 1136 comprises various information, such as a version identifier, a header checksum, a length of the object 1108, a slot context 1132, and/or other information used to access and manage data populated into the slots of the object 1108.

The slot context 1132 comprises various information about the slots, such as a compression type of a slot (e.g., a type of compression used to compress data of slots into a compression group or an indicator that the slot does not comprise compressed data), a start offset of the slot within the object 1108 (e.g., a slot identifier multiplied by a slot size, such as 11 kb), a logical data length of the slot (e.g., 11 kb), a compressed length (e.g., 0 if uncompressed), an index of the slot within a compression group of multiple slots (e.g., 0 if uncompressed), a logical data checksum, etc.

The data stored within the slots of the object 1108 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 1108 and/or a slot number of a slot comprising a portion of the data represented by the node. User data, directory blocks, metadata, inofile blocks of an inofile, and/or other data stored within the slots of the object 1108 may be represented by nodes within the data structure. In some embodiments, user data is stored within leaf nodes of the data structure (e.g., nodes within a level 0 (L0) level of the tree structure). Pointers (indirects) may be stored within non-leaf nodes of the data structure (e.g., nodes within a level 1 (L1), a level 2 (L2), and/or other levels of the tree structure). An inode object for the file may comprise pointers that point to non-leaf nodes within a top level of the data structure.

In some embodiments of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 11B illustrates a snapshot file system of data structures 1124 (e.g., a tree structure that can be traversed by a data connector component) used to represent snapshots (e.g., snapshots of one or more volumes managed by the computing device 1102) stored into the objects 1110 of the object store 1109. There is one base root object per volume, such as a base root object 1112 for a volume of which the snapshots were captured. There is a unique root object per volume, such as a unique root object 1114 for the volume. The base root object 1112 may point to the unique root object 1114. Names of the unique root objects may be derived from increasing generation numbers. The unique root object 1114 may point to snapinfo objects, such as a snapinfo object 1116 comprising information regarding one or more snapshots, such as a pointer to an inofile 1118 of a second snapshot of the volume. The inofile 1118 comprises cloud block numbers of slots within an object comprising data of the second snapshot, such as a pointer to an indirect 1120 that points to data 1122 of the snapshot. The inofile 1118 may comprise or point to information relating to directories, access control lists, and/or other information.

A mapping metafile (a VMAP) is maintained for the object 1108. The mapping metafile maps block numbers of primary storage of the computing device 1102 (e.g., virtual volume block numbers of the data stored into slots of the object 1108) to cloud block numbers of nodes representing portions of the data stored within the slots of the object 1108. The object 1108 is stored within the object store 1109. In some embodiments of storing objects into the object store 1109, the plurality of snapshots 1104, maintained by the computing device 1102, are stored within objects 1110 of the object store 1109. Each snapshot is identifiable through a snapinfo object that has a unique generation number. As will be described later, the objects 1110 within the object store 1109 may be deduplicated with respect to one another (e.g., the object 1108 is deduplicated with respect to the object 1110 using the mapping metafile as part of being stored into the object store 1109) and retain compression used by the computing device 1102 for storing the snapshots 1104 within the primary storage.

The mapping metafile and/or the data structure are used to provide access through the object file system to portions of data within the slots of the object 1108 in the object store 1109. In some embodiments, the inode object and the data structure are traversed to identify a sequence number and slot number of requested data. The sequence number and the slot number are used to access the requested data within a corresponding slot of the object 1108. In some embodiments, a read request targets a 100,000th level 0 block stored within the object 1108. The inode object is read to calculate which blocks in each level of the data structure will have 100,000 (e.g., 100,000/255 is a 493th block in level 1 and 493/255 is a 2nd block in level 2). These blocks are read at each level to go to a next level through appropriate pointers (e.g., cloud block numbers) until the data is read from a block of user data within the level 0. The pointers are cloud block numbers, where a pointer comprises a sequence number of the object 1108 and a slot number. The sequence number corresponds to an object name of the object 1108 and the slot number is which slot the data is located within the object 1108.

In an embodiment, an on-demand restore of data within a snapshot stored within objects of the object store 1109 can be performed to a target computing device using the mapping metafile and/or the data structure. In an embodiment, the mapping metafile and/or the data structure may be used to free objects from the object store 1109 based upon the objects comprising snapshot data of snapshots deleted by the computing device 1102.

In an embodiment, the mapping metafile and/or an overflow mapping metafile are used to facilitate the copying of the snapshots to the object store 1109 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 1104 maintained by the computing device 1102 and copied into the objects 1110 of the object store 1109 as copied snapshots. An entry within the mapping metafile is populated with a mapping between a block number of data within a snapshot at the computing device 1102 (e.g., a virtual volume block number) and a cloud block number (e.g., a cloud physical volume block number) of a slot within an object into which the data was copied when the snapshot was copied to the object store 1109 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 1102 within the primary storage, which are copied to the object store as copied snapshots). In some embodiments, the block numbers may correspond to virtual volume block numbers of data of the snapshots stored by the computing device 1102 within the primary storage. In some embodiments, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 1102.

The mapping metafile and/or the overflow mapping metafile is used to determine what data of the current snapshot is to be copied to the object store 1109 and what data already exists within the object store 1109 so that only data not already within the object store 1109 is transmitted to the object store 1109 for storage within an object. Upon determining that the current snapshot is to be copied to the object store 1109, an invalidation phase is performed. In particular, a list of deallocated block numbers of primary storage of the computing device 1102 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 1109 and a prior copied snapshot already copied from the primary storage to the object store 1109 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 1109.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In some embodiments, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 1109 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 1109. Once the object is stored within the object store 1109, the mapping metafile and/or the overflow mapping metafile is updated with entries for the deduplicated set of changed block numbers based upon receiving an acknowledgment of the object being stored by the object store 1109. An entry will map a changed block number to a cloud block number of a slot within which data of the changed block number is stored in the object.

In an embodiment, the object file system is used to provide various primary storage system services for the object store 1109 in order to achieve efficient space and resource management, and flexible scaling in the object store 1109 (e.g., a cloud computing environment). Additionally, pseudo read only snapshots are provided through the object store 1109. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 1102). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 1109, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 1102, to the object store 1109 such as cloud services within the cloud storage environment.

In one embodiment, objects within the object store 1109 (e.g., objects within a cloud computing environment) can be maintained with a read only attribute such that data within objects can be overwritten/modified/freed so long as in-use data within the objects is not altered. In particular, an object may be maintained within the object store 1109, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 1102 is storing data of a snapshot of a local file system within a slot of an object, and thus the snapshot data is in-use until a particular event occurs such as the computing device 1102 deleting the snapshot). In some embodiments, the object comprises snapshot data of a file system, a volume, a logical unit number (LUN), a file, or any other data of the computing device 1102. In this way, the object comprises a read only snapshot of data of the computing device 1102. In one example, a plurality of objects corresponding to read only snapshots of the file system of the computing device 1102 are stored within the object store 1109. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 1102 (a primary storage system). For example, an in-use slot may be a slot that comprises snapshot data (e.g., secondary/replicated data) of a snapshot created by a computing device 1102. The slot becomes an unused slot when the data is no longer actively referenced, used, and/or maintained, such as where the computing device 1102 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In some embodiments, the additional data is generated by a cloud service or application executing within the cloud computing environment. This will offload processing and resource utilization that would otherwise be used by the computing device 1102 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In some embodiments, a second rule is enforced for the object. The second rule specifies that related read operations are to be directed to a same version of an object. For example, an object corresponds to secondary/replicated snapshot data of a file system maintained by the computing device 1102. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In some embodiments, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 1109. The objects have a read only state, such that enforcement of the first rule ensures that in-use data within slots of an object is not modifiable, thus making objects pseudo read only objects because only unused slots can be modified/freed of unused data. In some embodiments, an object is used to store data of a snapshot of a file system hosted by the computing device 1102. The snapshot may be determined as being deleted by the computing device 1102, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In some embodiments, the garbage collection operation is executed by a cloud service in order to conserve resource consumption by the computing device 1102 (primary storage system) otherwise used to execute the garbage collection operation. The garbage collection operation free objects from the object store 1109 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 1109 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 1109. However, if the object is not unique to only deleted snapshot(s) such as where the object also stores data of an active/undeleted snapshot, then the object is not freed.

In an embodiment, defragmentation is provided for fragmented objects within the object store 1109. In some embodiments, defragmentation is implemented by a cloud service or application executing in the object store 1109 in order to conserve resources otherwise used by a computing device 1102 (primary storage system) that would execute defragmentation functionality. An object within the object store 1109 is determined to be a fragmented object based upon the object comprising at least one freed slot from which data was freed. For example, a freed slot may comprise an unused slot comprising unused data no longer referenced/used by the computing device 1102 (e.g., data of a deleted snapshot). Accordingly, the fragmented object may comprise one or more in-use slots of in-use data currently referenced/used by a computing device 1102 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 1109.

The present system preserves deduplication and compression used by the computing device 1102 for snapshots when storing copied snapshots to the object store 1109 notwithstanding copied snapshots representing fully logical copies of data in the primary storage of the computing device 1102. In particular, deduplication is preserved because data that is shared in a snapshot (e.g., a local or primary snapshot created and maintain by the node) is also shared in a copied snapshot in the object store 1109. Deduplication of compression groups is maintained while logically representing the compression groups in a copied snapshot. Block sharing across multiple snapshots is also preserved so that merely changed blocks are transferred/copied to the object store 1109 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 1102 of the storage system since access to the primary storage of the computing device 1102 may be more read intensive, and thus read efficiency is prioritized over storage space efficiency. Because copied snapshots in the object store 1109 are infrequently accessed (e.g., cold data that is infrequently read), relatively larger compression groups can be employed for improved storage space efficiency within the object store, which also reduces network bandwidth for snapshot copying to the object store 1109.

In one embodiment, snapshots maintained by the computing device 1102 are copied to the object store 1109 as copied snapshots representing logical data of the snapshots. Data of the copied snapshots is stored into slots of objects that are deduplicated with respect to other objects stored within the object store 1109 and retain compression used by the computing device 1102 for the snapshots.

In some embodiments, the computing device 1102 stores data within primary storage. The computing device 1102 may create snapshots of the data stored by the computing device 1102. For example, the computing device 1102 may create a snapshot of a file, a logical unit number, a directory, a volume, a storage virtual machine hosting a plurality of volumes, a file system, a consistency group of any arbitrary grouping of files, directories, or data, etc. The computing device 1102 may deduplicate data between the snapshots so that instead of storing redundant data blocks multiple times, merely references are stored in place of the redundant data blocks and point to original data blocks with the same data. The computing device 1102 may compress data within the snapshots, such as by creating compression groups of compressed data blocks.

The mapping metafile and/or the overflow mapping metafile is used to determine what data of the current snapshot is to be copied to the object store 1109 and what data already exists within the object store so that only data not already within the object store is transmitted to the object store 1109 for storage within an object. Upon determining that the current snapshot is to be copied to the object store, an invalidation phase is performed. In particular, a list of deallocated block numbers of primary storage of the computing device 1102 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

Figure 12:
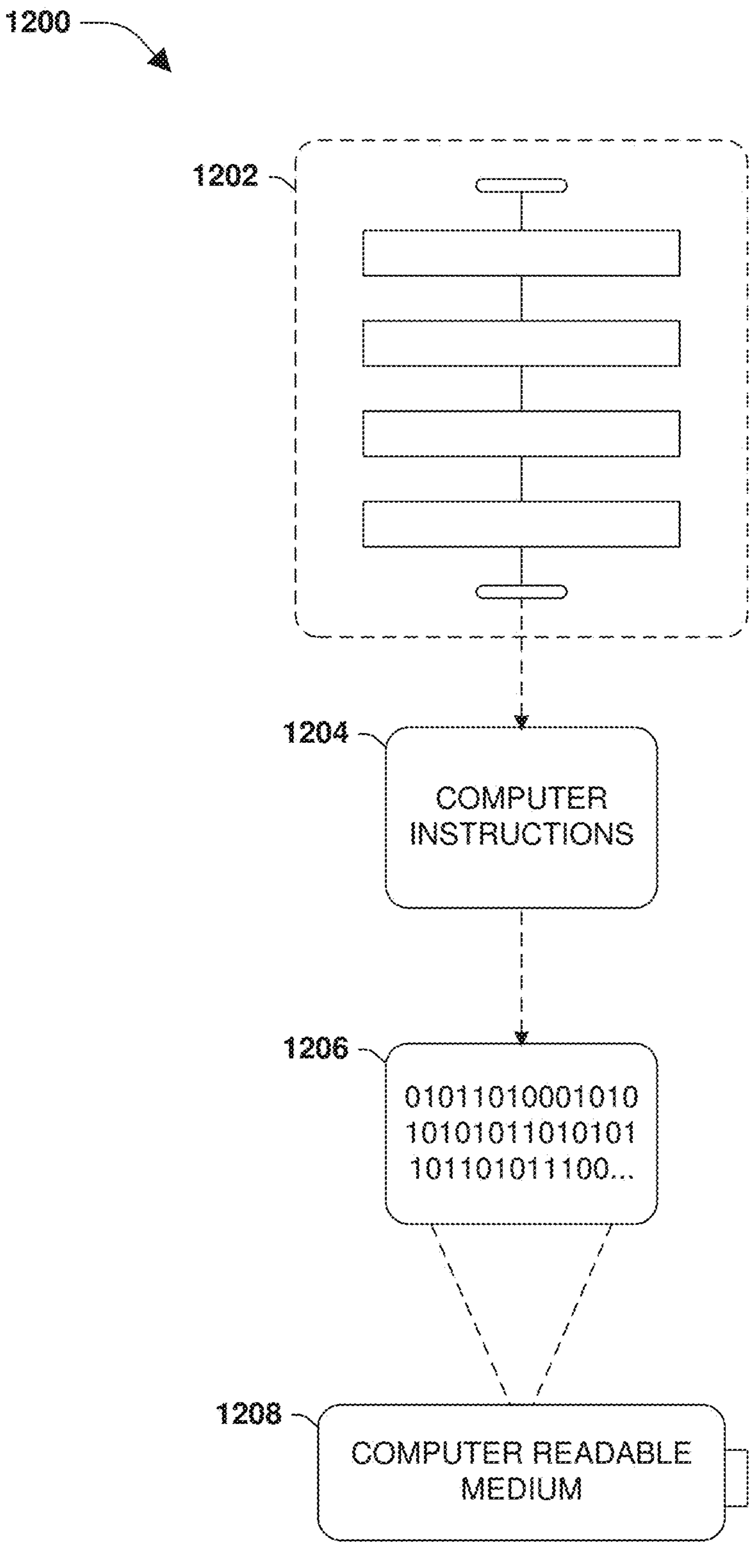
FIG. 12 is an example of a computer readable medium in which an embodiment of the present technology may be implemented.

Still another embodiment involves a computer-readable medium 1200 comprising processor-executable instructions configured to implement one or more of the techniques presented herein. An example embodiment of a computer-readable medium or a computer-readable device that is devised in these ways is illustrated in FIG. 12, wherein the implementation comprises a computer-readable medium 1208, such as a compact disc-recordable (CD-R), a digital versatile disc-recordable (DVD-R), flash drive, a platter of a hard disk drive, etc., on which is encoded computer-readable data 1206. This computer-readable data 1206, such as binary data comprising at least one of a zero or a one, in turn comprises processor-executable computer instructions 1204 configured to operate according to one or more of the principles set forth herein. In some embodiments, the processor-executable computer instructions 1204 are configured to perform a method 1202, such as at least some of the exemplary method 100 of FIG. 1, at least some of the method 300 of FIG. 3, and/or at least some the exemplary method 500 of FIG. 5 for example. In some embodiments, the processor-executable computer instructions 1204 are configured to implement a system, such as at least some of the exemplary system 200 of FIGS. 2A and 2B, at least some of the exemplary system 400 of FIGS. 4A-4C, and/or at least some of the exemplary system 600 of FIG. 6, for example. Many such computer-readable media are contemplated to operate in accordance with the techniques presented herein.

Figure 13:
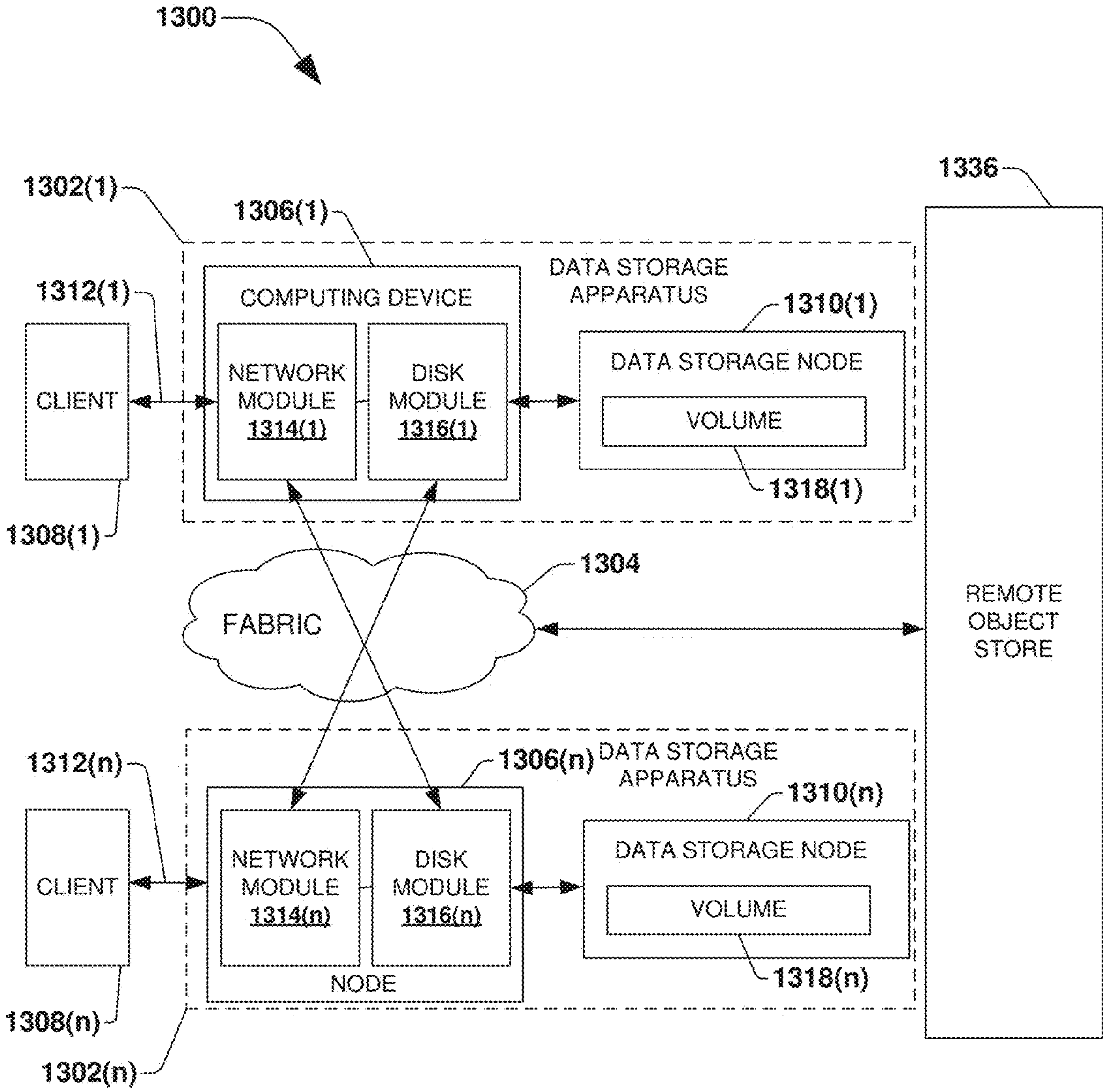
FIG. 13 is a block diagram illustrating a network environment with exemplary node computing devices.

A clustered network environment 1300 that may implement one or more aspects of the techniques described and illustrated herein is shown in FIG. 13. The clustered network environment 1300 includes data storage apparatuses **1302(1)-1302(*n*) that are coupled over a cluster or cluster fabric 1304 that includes one or more communication network(s) and facilitates communication between the data storage apparatuses 1302(1)-1302(*n*) (and one or more modules, components, etc. therein, such as, computing devices 1306(1)-1306(*n*), for example), although any number of other elements or components can also be included in the clustered network environment 1300** in other examples.

In this example, computing devices **1306(1)-1306(*n*) can be primary or local storage controllers or secondary or remote storage controllers that provide client devices 1308(1)-1308(*n*) with access to data stored within data storage devices 1310(1)-1310(*n*) and storage devices of a remote object store 1336. The computing devices 1306(1)-1306(*n*) may be implemented as hardware, software (e.g., a storage virtual machine), or combination thereof. The computing devices 1306(1)-1306(*n*)** may be used to host containers of a container orchestration platform.

The data storage apparatuses **1302(1)-1302(*n*) and/or computing devices 1306(1)-1306(*n*) of the examples described and illustrated herein are not limited to any particular geographic areas and can be clustered locally and/or remotely via a cloud network, or not clustered in other examples. Thus, in one example the data storage apparatuses 1302(1)-1302(*n*) and/or computing device computing device 1306(1)-1306(*n*) can be distributed over a plurality of storage systems located in a plurality of geographic locations (e.g., located on-premise, located within a cloud computing environment, etc.); while in another example a clustered network can include data storage apparatuses 1302(1)-1302(*n*) and/or computing device computing device 1306(1)-1306(*n*)** residing in a same geographic location (e.g., in a single on-site rack).

In the illustrated example, one or more of the client devices **1308(1)-1308(*n*), which may be, for example, personal computers (PCs), computing devices used for storage (e.g., storage servers), or other computers or peripheral devices, are coupled to the respective data storage apparatuses 1302(1)-1302(*n*) by network connections 1312(1)-1312(*n*). Network connections 1312(1)-1312(*n*)** may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices **1308(1)-1308(*n*) may be general-purpose computers running applications and may interact with the data storage apparatuses 1302(1)-1302(*n*) using a client/server model for exchange of information. That is, the client devices 1308(1)-1308(*n*) may request data from the data storage apparatuses 1302(1)-1302(*n*) (e.g., data on one of the data storage devices 1310(1)-1310(*n*) managed by a network storage controller configured to process I/O commands issued by the client devices 1308(1)-1308(*n*)), and the data storage apparatuses 1302(1)-1302(*n*) may return results of the request to the client devices 1308(1)-1308(*n*) via the network connections 1312(1)-1312(*n*)**.

The computing devices **1306(1)-1306(*n*) of the data storage apparatuses 1302(1)-1302(*n*) can include network or host computing devices that are interconnected as a cluster to provide data storage and management services, such as to an enterprise having remote locations, cloud storage (e.g., a storage endpoint may be stored within storage devices of the remote object store 1336), etc., for example. Such computing devices 1306(1)-1306**(*n*) can be attached to the cluster fabric 1304 at a connection point, redistribution point, or communication endpoint, for example. One or more of the computing devices 1306(1)-1306(*n*) may be capable of sending, receiving, and/or forwarding information over a network communications channel, and could comprise any type of device that meets any or all of these criteria.

In an embodiment, the computing devices 1306(1) and 1306(*n*) may be configured according to a disaster recovery configuration whereby a surviving computing device provides switchover access to the data storage devices 1310(1)-1310(*n*) in the event a disaster occurs at a disaster storage site (e.g., the computing device computing device 1306(1) provides client device 1312(*n*) with switchover data access to data storage devices 1310(*n*) in the event a disaster occurs at the second storage site). In other examples, the computing device computing device 1306(*n*) can be configured according to an archival configuration and/or the computing devices 1306(1)-1306(*n*) can be configured based on another type of replication arrangement (e.g., to facilitate load sharing). Additionally, while two computing devices are illustrated in FIG. 13, any number of computing devices or data storage apparatuses can be included in other examples in other types of configurations or arrangements.

As illustrated in the clustered network environment 1300, computing devices 1306(1)-1306(*n*) can include various functional components that coordinate to provide a distributed storage architecture. For example, the computing devices 1306(1)-1306(*n*) can include network modules 1314(1)-1314(*n*) and disk modules 1316(1)-1316(*n*). Network modules 1314(1)-1314(*n*) can be configured to allow the computing devices 1306(1)-1306(*n*) (e.g., network storage controllers) to connect with client devices 1308(1)-1308(*n*) over the storage network connections 1312(1)-1312(*n*), for example, allowing the client devices 1308(1)-1308(*n*) to access data stored in the clustered network environment 1300.

Further, the network modules 1314(1)-1314(*n*) can provide connections with one or more other components through the cluster fabric 1304. For example, the network module 1314(1) of computing device computing device 1306(1) can access the data storage device 1310(*n*) by sending a request via the cluster fabric 1304 through the disk module 1316(*n*) of computing device computing device 1306(*n*) when the computing device computing device 1306(*n*) is available. Alternatively, when the computing device computing device 1306(*n*) fails, the network module 1314(1) of computing device computing device 1306(1) can access the data storage device 1310(*n*) directly via the cluster fabric 1304. The cluster fabric 1304 can include one or more local and/or wide area computing networks (i.e., cloud networks) embodied as Infiniband, Fibre Channel (FC), or Ethernet networks, for example, although other types of networks supporting other protocols can also be used.

Disk modules 1316(1)-1316(*n*) can be configured to connect data storage devices 1310(1)-1310(*n*), such as disks or arrays of disks, SSDs, flash memory, or some other form of data storage, to the computing devices 1306(1)-1306(*n*). Often, disk modules 1316(1)-1316(*n*) communicate with the data storage devices 1310(1)-1310(*n*) according to the SAN protocol, such as SCSI or FCP, for example, although other protocols can also be used. Thus, as seen from an operating system on computing devices 1306(1)-1306(*n*), the data storage devices 1310(1)-1310(*n*) can appear as locally attached. In this manner, different computing devices 1306(1)-1306(*n*), etc. may access data blocks, files, or objects through the operating system, rather than expressly requesting abstract files.

While the clustered network environment 1300 illustrates an equal number of network modules 1314(1)-1314(*n*) and disk modules 1316(1)-1316(*n*), other examples may include a differing number of these modules. For example, there may be a plurality of network and disk modules interconnected in a cluster that do not have a one-to-one correspondence between the network and disk modules. That is, different computing devices can have a different number of network and disk modules, and the same computing device computing device can have a different number of network modules than disk modules.

Further, one or more of the client devices 1308(1)-1308(*n*) can be networked with the computing devices 1306(1)-1306(*n*) in the cluster, over the storage connections 1312(1)-1312(*n*). As an example, respective client devices 1308(1)-1308(*n*) that are networked to a cluster may request services (e.g., exchanging of information in the form of data packets) of computing devices 1306(1)-1306(*n*) in the cluster, and the computing devices 1306(1)-1306(*n*) can return results of the requested services to the client devices 1308(1)-1308(*n*). In one example, the client devices 1308(1)-1308(*n*) can exchange information with the network modules 1314(1)-1314(*n*) residing in the computing devices 1306(1)-1306(*n*) (e.g., network hosts) in the data storage apparatuses 1302(1)-1302(*n*).

In one example, the storage apparatuses 1302(1)-1302(*n*) host aggregates corresponding to physical local and remote data storage devices, such as local flash or disk storage in the data storage devices 1310(1)-1310(*n*), for example. One or more of the data storage devices 1310(1)-1310(*n*) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 1318(1)-1318(*n*) in this example, although any number of volumes can be included in the aggregates. The volumes 1318(1)-1318(*n*) are virtual data stores or storage objects that define an arrangement of storage and one or more file systems within the clustered network environment 1300. Volumes 1318(1)-1318(*n*) can span a portion of a disk or other storage device, a collection of disks, or portions of disks, for example, and typically define an overall logical arrangement of data storage. In one example, volumes 1318(1)-1318(*n*) can include stored user data as one or more files, blocks, or objects that may reside in a hierarchical directory structure within the volumes 1318(1)-1318(*n*).

Volumes 1318(1)-1318(*n*) are typically configured in formats that may be associated with particular storage systems, and respective volume formats typically comprise features that provide functionality to the volumes 1318(1)-1318(*n*), such as providing the ability for volumes 1318(1)-1318(*n*) to form clusters, among other functionality. Optionally, one or more of the volumes 1318(1)-1318(*n*) can be in composite aggregates and can extend between one or more of the data storage devices 1310(1)-1310(*n*) and one or more of the storage devices of the remote object store 1336 to provide tiered storage, for example, and other arrangements can also be used in other examples.

In one example, to facilitate access to data stored on the disks or other structures of the data storage devices 1310(1)-1310(*n*), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 1310(1)-1310(*n*) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 1310(1)-1310(*n*) can have one or more physical ports, wherein each physical port can be assigned a target address (e.g., SCSI target address). To represent respective volumes, a target address on the data storage devices 1310(1)-1310(*n*) can be used to identify one or more of the LUNs. Thus, for example, when one of the computing devices 1306(1)-1306(*n*) connects to a volume, a connection between the one of the computing devices 1306(1)-1306(*n*) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 14:
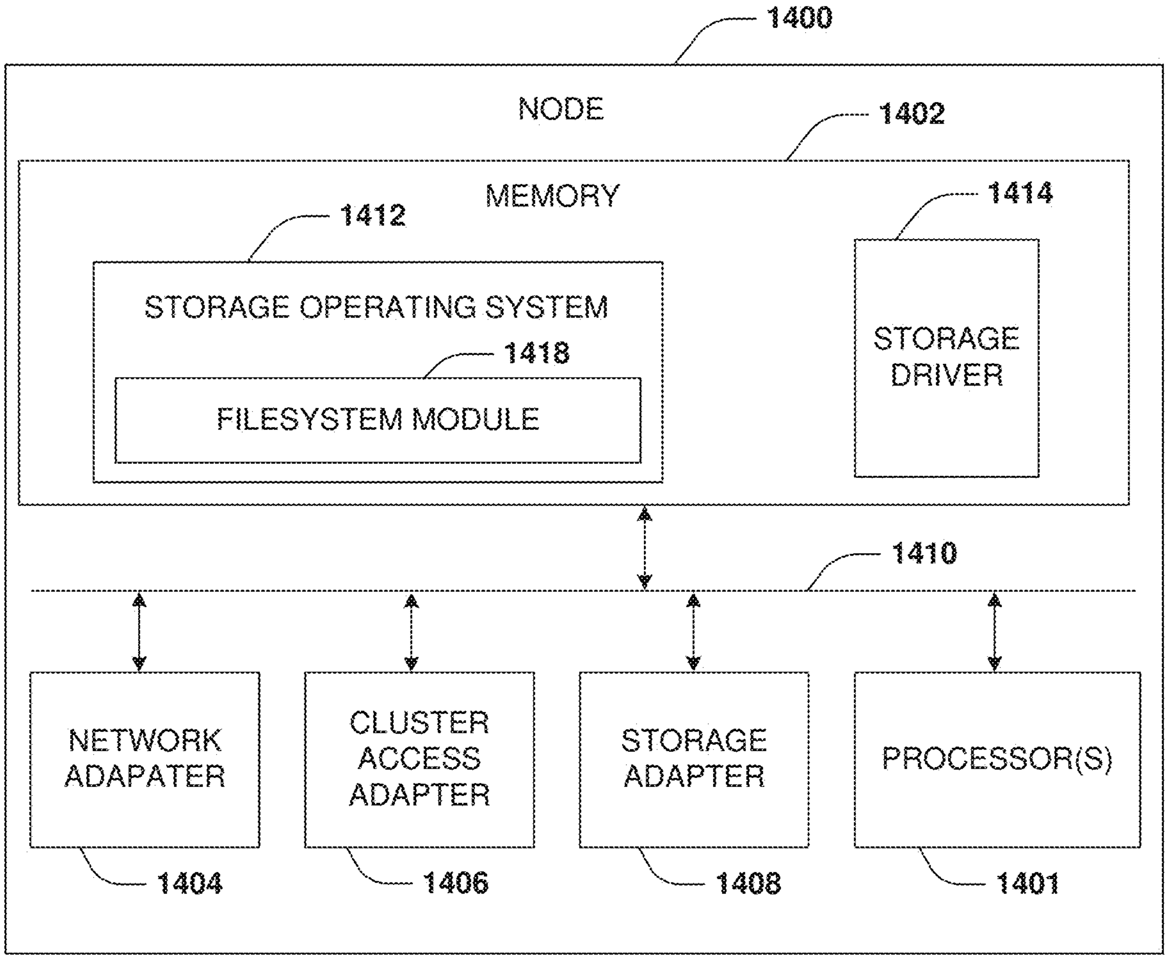
FIG. 14 is a block diagram illustrating an exemplary node computing device.

Referring to FIG. 14, a node 1400 in this particular example includes processor(s) 1401, a memory 1402, a network adapter 1404, a cluster access adapter 1406, and a storage adapter 1408 interconnected by a system bus 1410. In other examples, the node 1400 comprises a virtual machine, such as a virtual storage machine.

The node 1400 also includes a storage operating system 1412 installed in the memory 1402 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 1404 in this example includes the mechanical, electrical and signaling circuitry needed to connect the node 1400 to one or more of the client devices over network connections, which may comprise, among other things, a point-to-point connection or a shared medium, such as a local area network. In some examples, the network adapter 1404 further communicates (e.g., using TCP/IP) via a cluster fabric and/or another network (e.g., a WAN) (not shown) with storage devices of a distributed storage system to process storage operations associated with data stored thereon.

The storage adapter 1408 cooperates with the storage operating system 1412 executing on the node 1400 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 1408 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 1408 and, if necessary, processed by the processor(s) 1401 (or the storage adapter 1408 itself) prior to being forwarded over the system bus 1410 to the network adapter 1404 (and/or the cluster access adapter 1406 if sending to another node computing device in the cluster) where the information is formatted into a data packet and returned to a requesting one of the client devices and/or sent to another node computing device attached via a cluster fabric. In some examples, a storage driver 1414 in the memory 1402 interfaces with the storage adapter to facilitate interactions with the data storage devices.

The storage operating system 1412 can also manage communications for the node 1400 among other devices that may be in a clustered network, such as attached to the cluster fabric. Thus, the node 1400 can respond to client device requests to manage data on one of the data storage devices or storage devices of the distributed storage system in accordance with the client device requests.

The file system module 1418 of the storage operating system 1412 can establish and manage one or more file systems including software code and data structures that implement a persistent hierarchical namespace of files and directories, for example. As an example, when a new data storage device (not shown) is added to a clustered network system, the file system module 1418 is informed where, in an existing directory tree, new files associated with the new data storage device are to be stored. This is often referred to as "mounting" a file system.

In the example node 1400, memory 1402 can include storage locations that are addressable by the processor(s) 1401 and adapters 1404, 1406, and 1408 for storing related software application code and data structures. The processor(s) 1401 and adapters 1404, 1406, and 1408 may, for example, include processing elements and/or logic circuitry configured to execute the software code and manipulate the data structures.

The storage operating system 1412, portions of which are typically resident in the memory 1402 and executed by the processor(s) 1401, invokes storage operations in support of a file service implemented by the node 1400. Other processing and memory mechanisms, including various computer readable media, may be used for storing and/or executing application instructions pertaining to the techniques described and illustrated herein. In this particular embodiment, the node 1400 also includes a module configured to implement the techniques described herein, as discussed above.

The examples of the technology described and illustrated herein may be embodied as one or more non-transitory computer or machine readable media, such as the memory 1402, having machine or processor-executable instructions stored thereon for one or more aspects of the present technology, which when executed by processor(s), such as processor(s) 1401, cause the processor(s) to carry out the steps necessary to implement the methods of this technology, as described and illustrated with the examples herein. In some examples, the executable instructions are configured to perform one or more steps of a method described and illustrated later.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

receiving a request to perform a restore operation for a subset of data of a volume group backed up to an object store as a volume group backup composed of a plurality of constituent volume backups of a set of constituent volumes forming the volume group;

evaluating a metafile to identify geometry information describing how the volume group is composed of the set of constituent volumes, including a first constituent volume and a second constituent volume, backed up to the object store as the plurality of constituent volume backups;

generating a restore target based upon the geometry information, wherein geometry information is used to create a first restore target constituent volume and a second restore target constituent volume as the restore target;

utilizing the metafile generate a first constituent volume restore workflow for the first restore target constituent volume and a second constituent volume restore workflow for the second restore target constituent volume; and implementing, by one or more nodes, the first constituent volume restore workflow and the second constituent volume restore workflow to restore the subset of data of the volume group to the restore target.

2. The method of claim 1, comprising:

evaluating the metafile to identify:

a group root info object representing a volume group endpoint within the object store;

a constituent volume root info object per constituent volume endpoint within the object store; and a group snapinfo object per constituent volume backup in the object store, wherein the group snapinfo objects are populated with group properties of the volume group backup; and utilizing the group root info object, the constituent volume root info objects, and the group snapinfo object to generate the one or more constituent volume restore workflows.

3. The method of claim 1, comprising:

restore a constituent volume or a single file of the volume group as the subset of data.

4. The method of claim 1, comprising:

incrementally restore the subset of data.

5. The method of claim 1, comprising:

restore a directory or qtree of the volume group as the subset of data.

6. The method of claim 1, comprising:

restore the subset of data on-demand.

7. A non-transitory machine readable medium comprising instructions, which when executed by a machine, causes the machine to:

receive a request to perform a restore operation for a subset of data of a volume group backed up to an object store as a volume group backup composed of a plurality of constituent volume backups of a set of constituent volumes forming the volume group;

evaluate a metafile to identify geometry information describing how the volume group is composed of the set of constituent volumes, including a first constituent volume and a second constituent volume, backed up to the object store as the plurality of constituent volume backups;

generate a restore target based upon the geometry information, wherein geometry information is used to create a first restore target constituent volume and a second restore target constituent volume as the restore target;

utilize the metafile generate a first constituent volume restore workflow for the first restore target constituent volume and a second constituent volume restore workflow for the second restore target constituent volume; and implement, by one or more nodes, the first constituent volume restore workflow and the second constituent volume restore workflow to restore the subset of data of the volume group to the restore target.

8. The non-transitory machine readable medium of claim 7, wherein the instructions cause the machine to:

evaluate the metafile to identify:

a group root info object representing a volume group endpoint within the object store;

a constituent volume root info object per constituent volume endpoint within the object store; and a group snapinfo object per constituent volume backup in the object store, wherein the group snapinfo objects are populated with group properties of the volume group backup;

utilize the group root info object, the constituent volume root info objects, and the group snapinfo object to generate the one or more constituent volume restore workflows.

9. The non-transitory machine readable medium of claim 7, wherein the instructions cause the machine to:

incrementally restore the subset of data.

10. The non-transitory machine readable medium of claim 7, wherein the instructions cause the machine to:

restore a directory or qtree of the volume group as the subset of data.

11. The non-transitory machine readable medium of claim 7, wherein the instructions cause the machine to:

restore the subset of data on-demand.

12. A computing device comprising:

a memory comprising machine executable code; and a processor coupled to the memory, the processor configured to execute the machine executable code to cause the processor to:

receive a request to perform a restore operation for a subset of data of a volume group backed up to an object store as a volume group backup composed of a plurality of constituent volume backups of a set of constituent volumes forming the volume group;

evaluate a metafile to identify geometry information describing how the volume group is composed of the set of constituent volumes, including a first constituent volume and a second constituent volume, backed up to the object store as the plurality of constituent volume backups;

generate a restore target based upon the geometry information, wherein geometry information is used to create a first restore target constituent volume and a second restore target constituent volume as the restore target;

utilize the metafile generate a first constituent volume restore workflow for the first restore target constituent volume and a second constituent volume restore workflow for the second restore target constituent volume; and implement, by one or more nodes, the first constituent volume restore workflow and the second constituent volume restore workflow to restore the subset of data of the volume group to the restore target.

13. The computing device of claim 12, wherein the machine executable code causes the processor to:

evaluate the metafile to identify a group root info object representing a volume group endpoint within the object store; and utilize the group root info object to generate the one or more constituent volume restore workflows.

14. The computing device of claim 12, wherein the machine executable code causes the processor to:

evaluate the metafile to identify a constituent volume root info object per constituent volume endpoint within the object store; and utilize the constituent volume root info object to generate the one or more constituent volume restore workflows.

15. The computing device of claim 12, wherein the machine executable code causes the processor to:

evaluate the metafile to identify a group snapinfo object per constituent volume backup in the object store, wherein the group snapinfo objects are populated with group properties of the volume group backup; and utilize the group snapinfo object to generate the one or more constituent volume restore workflows.

16. The computing device of claim 12, wherein the machine executable code causes the processor to:

restore a constituent volume of the volume group as the subset of data using a group root info object.

17. The computing device of claim 12, wherein the machine executable code causes the processor to:

restore a constituent volume of the volume group as the subset of data using a constituent volume root info object.

18. The computing device of claim 12, wherein the machine executable code causes the processor to:

restore a constituent volume of the volume group as the subset of data using a group snapinfo object.

19. The computing device of claim 12, wherein the machine executable code causes the processor to:

incrementally restore the subset of data.

20. The computing device of claim 12, wherein the machine executable code causes the processor to:

restore a directory or qtree of the volume group as the subset of data.

* * * * *